(12) United States Patent
Dave et al.

(10) Patent No.: US 12,142,053 B2
(45) Date of Patent: Nov. 12, 2024

(54) SELF-SUPERVISED PRIVACY PRESERVATION ACTION RECOGNITION SYSTEM

(71) Applicant: University of Central Florida Research Foundation, Inc., Orlando, FL (US)

(72) Inventors: Ishan Rajendrakumar Dave, Orlando, FL (US); Chen Chen, Orlando, FL (US); Mubarak Shah, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 18/621,308

(22) Filed: Mar. 29, 2024

(65) Prior Publication Data
US 2024/0331389 A1    Oct. 3, 2024

Related U.S. Application Data

(60) Provisional application No. 63/455,451, filed on Mar. 29, 2023.

(51) Int. Cl.
*G06V 20/52* (2022.01)
*G06F 21/62* (2013.01)
(Continued)

(52) U.S. Cl.
CPC .......... *G06V 20/52* (2022.01); *G06F 21/6254* (2013.01); *G06V 10/82* (2022.01); *G06V 20/44* (2022.01); *G06V 40/20* (2022.01)

(58) Field of Classification Search
None
See application file for complete search history.

(56) References Cited

U.S. PATENT DOCUMENTS

| | | | | |
|---|---|---|---|---|
| 11,475,158 B1* | 10/2022 | Zhang | ................... | G06V 10/82 |
| 2023/0252173 A1* | 8/2023 | Amonkar | ............. | H04L 9/0825 |
| | | | | 713/189 |

(Continued)

OTHER PUBLICATIONS

Wu et al. "Privacy-Preserving Deep Action Recognition: An Adversarial Learning Framework and a New Dataset", Mar. 21, 2021. pp. 1-18 (Year: 2021).*

(Continued)

*Primary Examiner* — James M Anderson, II
(74) *Attorney, Agent, or Firm* — Anton J. Hopen; Smith & Hopen, P.A.

(57) ABSTRACT

This invention relates to a self-supervised privacy preservation action recognition system leveraging a learnable transformation anonymization function. The system is designed to process videos by removing spatial cues to protect privacy while retaining critical information for action recognition. The anonymization function, based on an encoder-decoder model, undergoes iterative training on a dataset to optimize the balance between obscuring privacy-sensitive information and preserving capability of recognizing actions. This training involves freezing and adjusting the weights of an action recognition branch and a self-supervised privacy removal branch to refine the model's effectiveness. The outcome is an anonymized video with minimized privacy information leakage, suitable for action analysis without privacy labels. Additional functionalities include frame sampling for enhanced privacy evaluation, data augmentation for model robustness, and a minimax optimization protocol ensuring optimal action recognition accuracy alongside privacy preservation.

21 Claims, 15 Drawing Sheets

(51) Int. Cl.
  *G06V 10/82* (2022.01)
  *G06V 20/40* (2022.01)
  *G06V 40/20* (2022.01)

(56) References Cited

U.S. PATENT DOCUMENTS

| | | | |
|---|---|---|---|
| 2023/0260652 A1* | 8/2023 | Azizi | G06T 7/0012 382/128 |
| 2023/0419170 A1* | 12/2023 | Chopde | G06N 20/00 |
| 2024/0119289 A1* | 4/2024 | Gonzalez Sanchez | G06N 3/082 |

OTHER PUBLICATIONS

Zhang et al., Privacy Preserving Automatic Fall Detection for Elderly Using RGBD Cameras. 2012. In: Miesenberger, K., Karshmer, A., Penaz, P., Zagler, W. (eds) Computers Helping People with Special Needs. ICCHP 2012. Lecture Notes in Computer Science, vol. 7382.

Kumawat et al. Privacy-Preserving Action Recognition via Motion Difference Quantization. 2012. In: Avidan, S., Brostow, G., Cissé, M., Farinella, G.M., Hassner, T. (eds) Computer Vision—ECCV 2022. ECCV 2022. Lecture Notes in Computer Science, vol. 13673.

Wu et al. Privacy-Preserving Deep Action Recognition: An Adversarial Learning Framework and A New Dataset Apr. 1, 2022. In IEEE Transactions on Pattern Analysis and Machine Intelligence, vol. 44, No. 4, pp. 2126-2139.

Ryoo et al. Privacy-Preserving Human Activity Recognition from Extreme Low Resolution. 2017. Proceedings of the AAAI Conference on Artificial Intelligence, 31(1).

Wu et al. Towards Privacy-Preserving Visual Recognition via Adversarial Training: A Pilot Study. 2018. Proceedings of the European Conference on Computer Vision (ECCV), pp. 606-624.

Ren et al. Learning to Anonymize Faces for Privacy Preserving Action Detection. 2018. Proceedings of the European Conference on Computer Vision (ECCV), pp. 620-636.

* cited by examiner

Fig. 1 --PRIOR ART--

SELF-SUPERVISED PRIVACY PRESERVATION ACTION RECOGNITION SYSTEM

CROSS REFERENCE TO RELATED APPLICATIONS

The present application is a continuation of U.S. Provisional Patent Application Ser. No. 63/455,451 entitled "Self-Supervised Privacy Preservation Action Recognition System," filed Mar. 29, 2023.

BACKGROUND OF THE INVENTION

1. Field of the Invention

This invention relates, generally, to privacy preservation and action recognition systems. More specifically, it relates to a self-supervised privacy preservation action recognition system that minimizes private information leakage during action recognition without requiring privacy labels for individual frames.

2. Brief Description of the Prior Art

Recent advances in action recognition have enabled a wide range of real-world applications, such as video surveillance cameras, smart shopping systems, and elderly person monitor systems. Most of these video understanding applications involve extensive computation, for which a user needs to share the video data to a cloud computation server. However, in the process of sharing a video or other multimedia segment to the cloud server for the utility action recognition task, the user also shares private visual information contained within the shared segment, such as subject gender, skin color, clothing, background objects, and other potentially personally identifying information.

As shown in FIG. 1, attempts have been made to preserve privacy of subjects contained within a video segment 12 during an action recognition end use. For example, as shown in section A of FIG. 1, a simple solution for privacy preservation for a video segment 12 is to utilize very low-resolution videos 16, such as by downsampling 14 a video segment quality. Downsampling-based approaches utilize a very low-resolution input to anonymize personal identifiable information within a video segment, including by using blurring and superpixel clustering. Although this downsampling method does not require any specialized back-end computational training or privacy labeling to remove privacy features, it provides a suboptimal trade-off between action recognition performance and privacy preservation, since the poor quality of the video segment after downsampling does not provide for adequate action recognition.

Turning to section B of FIG. 1, another attempt to preserve privacy includes the use of pretrained object-detectors 22 to detect regions 26 that should be private, and the obfuscation (such as by removal or modification) of the detected regions using synthesis or blurring. Obfuscation-based approaches typically involve an object detector 22 and the input of an obstruction, such as a synthesized replacement image 26 or a blurring of the detected object. However, the detection-based approaches require bounding-box level annotations for the privacy attributes, thereby requiring extensive computational training and editing, and removing the privacy features without an end-to-end learning framework can result in the performance drop of the action recognition task, since the lack of an end-to-end solution requires two separate steps of private object detection/segmentation and object removal.

More recently, a novel approach was proposed to remove privacy features via learning an anonymization function through an adversarial training framework 28, which requires both action 18 and privacy labels 20 from the video 12. Although the method achieves a good trade-off of action recognition and privacy preservation, it has two main problems. First, it is not feasible to annotate a video dataset for privacy attributes, as conceded by the reference noting the immense efforts required to annotate privacy attributes for a small-scale video dataset PA-HMDB, which includes only 515 videos. Second, the learned anonymization function from the known privacy attributes may not generalize in anonymizing the novel privacy attributes. For example, as shown in section C of FIG. 1, the learned anonymization function for human-related privacy attributes (such as gender, skin color, and clothing) can still leave other privacy information (such as the scene or background objects) un-anonymized 30. Similar approaches have showed promise in utilizing a minimax optimization strategy, in which the action classification cost function is minimized while the privacy classification cost function is maximized. However, these approaches use privacy classifiers to remove only the privacy attributes from the input data, thereby requiring extensive computational resources in a non-self-supervised manner.

Accordingly, what is needed is a self-supervised privacy preservation action recognition system that allows action recognition while minimizing private information leakage in an output image without requiring supervision or input privacy labels. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The present invention includes both the application of an anonymization model and the process, method and system in which that model is created. As shown in FIG. 1, the objective is to intake video 12 for the purpose of detecting what action 18 is occurring. However, these videos may also include semantic information that conveys private information sought be removed. However, removal of identifiable information or anonymizing the video compromised the ability to detect what action was occurring and/or incurred high performance/computational expense to achieve. These drawbacks are addressed and mitigated by the present invention which is a self-supervised privacy preservation action recognition system.

An embodiment of the invention encompasses a self-supervised privacy preservation action recognition system, incorporating a computer processor configured to process a video composed of several frames. The system applies a learnable transformation anonymization function to the video, aimed at eliminating spatial cues from the frames while retaining necessary data for action recognition. This function stems from an anonymization model developed through iterative application to a training video dataset.

Within the system, there are designated branches: an action recognition branch and a self-supervised privacy removal branch. The system's procedure entails sequentially freezing these branches to allow specific weight adjustments within the anonymization branch, directed by the processor. This includes producing a first batch output, evaluating this against the branches for action recognition and privacy contrastive loss, generating a second batch output, and adjusting the weights based on these evaluations.

The function employs an encoder-decoder network structure with sigmoid activation layers to control the output values. For action recognition, a pre-trained three-dimensional convolutional neural network (3D-CNN) is used, while for privacy removal, a pre-trained two-dimensional convolutional neural network (2D-CNN) is utilized.

The system includes a frame sampling module for selecting frame pairs based on their temporal separation to facilitate the evaluation of privacy-preservation efficacy. Data augmentation techniques are applied to enhance the model's adaptability. The system utilizes a minimax optimization protocol to adjust the model parameters, targeting the balance between action recognition accuracy and privacy contrastive loss.

After the anonymization step, the learned anonymization module implements transformation on a test video to meet specified thresholds for action recognition accuracy and privacy preservation. The processor may also forward this test video to a cloud server for additional action recognition processing.

The training aspect involves same-dataset and cross-dataset training protocols to improve the model's versatility. Furthermore, the system's capability extends to evaluating the anonymization and action recognition models against datasets depicting actions not previously encountered in the training, assessing the system's effectiveness in new contexts. This approach ensures maintenance of action recognition while enhancing privacy in video content.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

All numerical designations, such as measurements, efficacies, physical characteristics, forces, and other designations, including ranges, are approximations which are varied up or down by increments of 1.0 or 0.1, as appropriate. It is to be understood, even if it is not always explicitly stated that all numerical designations are preceded by the term "about." As used herein, "about" or "approximately" refers to being within an acceptable error range for the particular value as determined by one of ordinary skill in the art, which will depend in part on how the value is measured or determined. As used herein, the term "about" refers to ±15% of the numerical; it should be understood that a numerical including an associated range with a lower boundary of greater than zero must be a non-zero numerical, and the term "about" should be understood to include only non-zero values in such scenarios.

Figure 1:
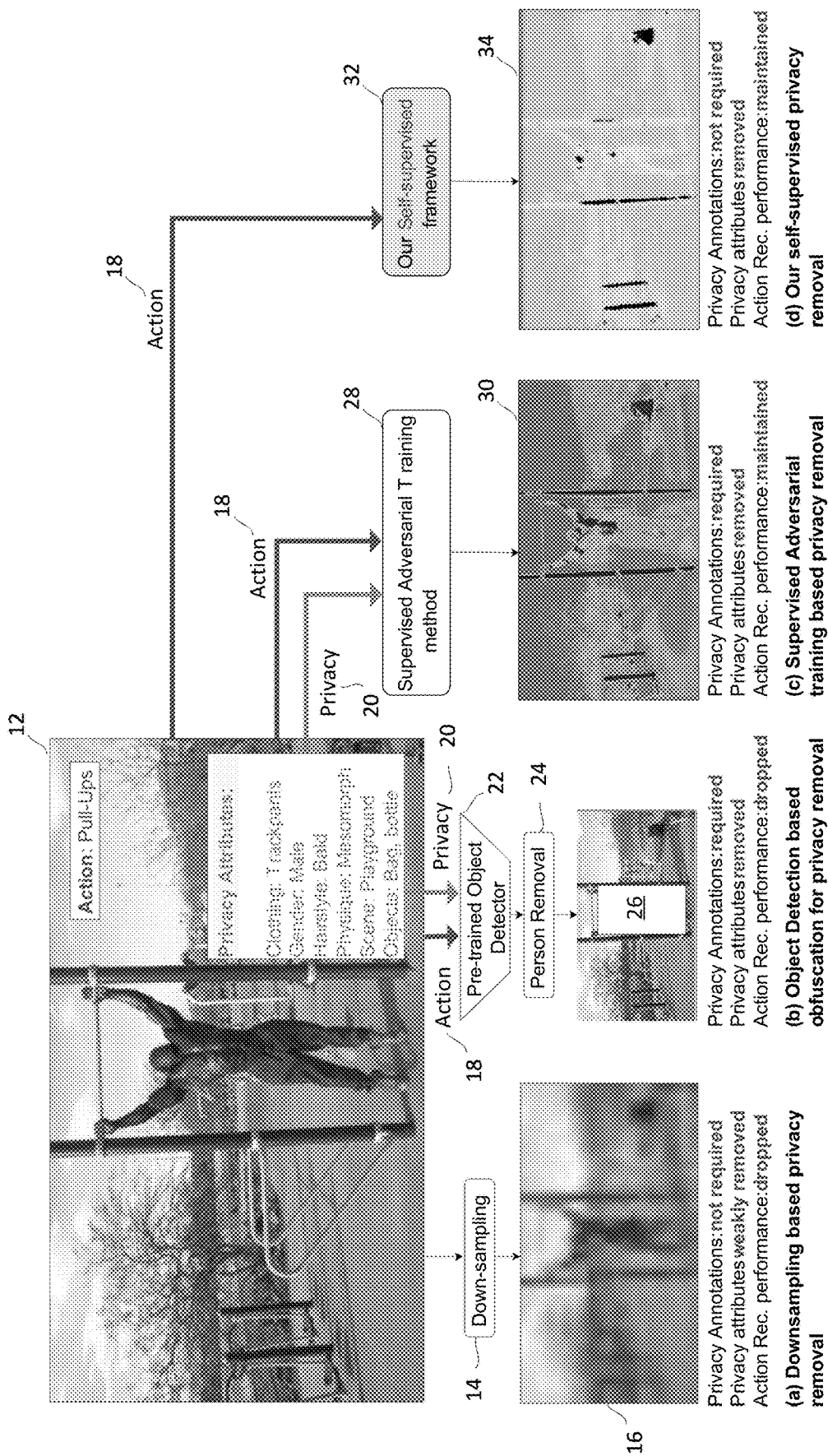
FIG. 1 is a schematic overview of existing privacy preserving action recognition approaches (in sections A, B, and C) compared to a self-supervised privacy preserving action recognition system and method (in section D), in accordance with an embodiment of the present invention.

As shown in section D of FIG. 1, the present invention includes a self-supervised privacy preservation system and method that allows for action recognition after private information is removed from a video segment 12, without requiring supervision or privacy labels. Instead of using a privacy classifier to remove only the privacy attributes from the input data, the system and method 32 removes all spatial semantic information from the video segment 12, while maintaining the useful utility action recognition information 34 by training an anonymization function via a minimax optimization. Embodiments of the self-supervised privacy preservation system and method will be discussed herein below.

One key of the system is learning an anonymization function such that privacy attributes deteriorate in an output without requiring privacy labels during training, while maintaining the performance of the action recognition task on the modified output. For example, considering a video dataset X with action an recognition as a utility task T and a privacy attribute classification as a budget task B, the goal of the system is to maintain the performance of T while minimizing the budget B to preserve privacy. This minimax function is achieved by learning an anonymization function $f_A$, which transforms (or anonymizes) the original raw data X. Assuming that the final system has any action target model $f_T'$ and any privacy target model $f_B'$, the goal of privacy preserving training is to find an optimal point of $f_A$ (referred to as $f_A^*$) by the following two criteria C1 (Equation 1) and C2 (Equation 2):

$$C1: L_T(f_T'(f_A^*(X)), Y_T) \approx L_T(f_T'(X), Y_T) \quad (1)$$

where T denotes the utility task, $L_T$ is the loss function, which is the standard cross entropy in the case of single action label $Y_T$ or the binary cross entropy in the case of multi-label actions $Y_T$; and $$C2: L_B(f_B'(f_A^*(X))) \approx L_B(f_B'(X)) \quad (2)$$

where B denotes the privacy budget, $L_B$ is the self-supervised loss for the system framework, and the binary cross entropy in the case of a supervised system framework, which requires privacy label annotations, is denoted as $Y_B$.

Increasing a self-supervised loss $L_B$ results in deteriorating all useful information regardless of whether or not the information involves privacy attributes. However, the useful information for the action recognition function is preserved via criterion C1. Combining criteria C1 and C2, the privacy preserving optimization equation can be expressed through Equation 3, in which the negative sign before $L_B$ indicates optimization by maximizing $L_B$:

$$f_A^* = \operatorname*{argmin}_{f_A}[L_T(f_T'(f_A(X)), Y_T) - L_B(f_B'(f_A(X)))] \quad (3)$$

Figure 2:
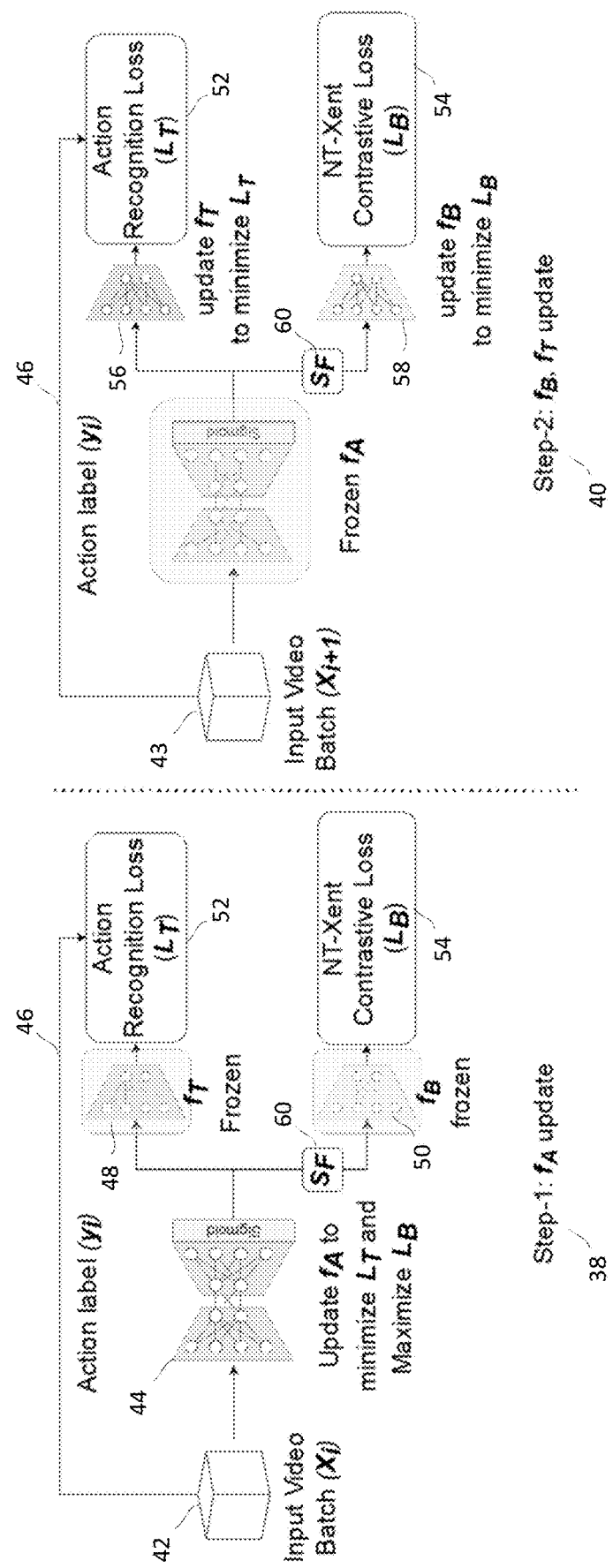
FIG. 2 is a schematic overview of a minimax optimization function using a self-supervised privacy preserving action recognition system and method, in accordance with an embodiment of the present invention.

Referring to FIG. 2, an embodiment of the system includes three components: 1) anonymization function ($f_A$), 2) self-supervised privacy removal branch, and 3) action recognition or utility branch. The process starts with Input Video Batch ($X_i$) 42, processed by an anonymization function ($f_A$) 44. This function is updated to minimize the action recognition loss ($L_T$) 46 and maximize the NT-Xent contrastive loss ($L_B$) 54. During the first phase, Step-1: $f_A$ update 38, the action recognition model ($f_T$) 48 is kept frozen. Similarly, the self-supervised privacy removal branch model ($f_B$) 50 is frozen, and a temporal sampler ($S_F$) 60 is utilized.

In the second phase, Step-2: $f_B$, $f_T$ update 40, a new Input Video Batch (Xi+1) 43 is introduced. Here, the anonymization function $f_A$ 56 is frozen, focusing on updating the action recognition model 52 to minimize $L_T$ and the privacy model $f_B$ 58 to minimize $L_B$. This utilizes the NT-Xent contrastive loss 54 to enhance the model's ability to anonymize privacy-sensitive features while optimizing the action recognition model's accuracy. This iterative approach balances privacy preservation with accurate action recognition. The anonymization function is a learnable transformation function, which transforms the video in such a way that the transformed information can be useful to learn action classification on any target model, $f_T'$, and not useful to learn any privacy target model, $f_B'$. An encoder-decoder neural network is used as the anonymization function. $f_A$ is initialized as an identity function by training the function using the $\mathcal{L}_{L1}$ reconstruction loss from Equation 4:

$$\mathcal{L}_{L1} = \sum_{c=1}^{C} \sum_{h=1}^{H} \sum_{w=1}^{W} |x_{c,h,w} - \hat{x}_{c,h,w}| \quad (4)$$

where x is the input image, $\hat{x}$ is the sigmoid output of $f_A$ logits, C denotes the input channels, H denotes the input height, and W denotes the input width.

Figure 3:
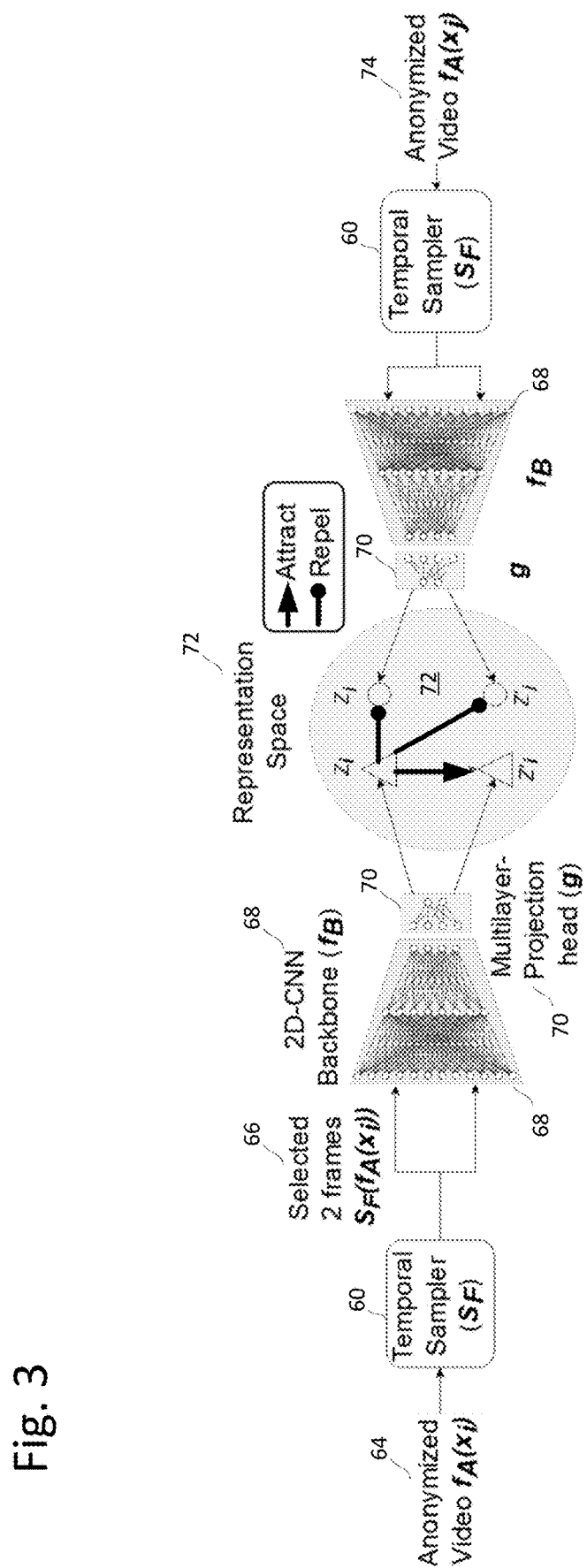
FIG. 3 depicts contrastive self-supervised loss that is used to maximize the agreement between two frames of a video and maximize disagreement between frames of different videos, in accordance with an embodiment of the present invention.

An embodiment of the schematic of the self-supervised removal branch is shown in FIG. 3. First, the video $x_i$ is passed through $f_A$ to obtain the anonymized video $f_A(x_i)$, which is further passed through a temporal frame sampler $S_F$, which samples two frames out of the video using various $S_F$ strategies. The sampled pair of frames $S_F(f_A(x_i))$ are projected into the representation space through a 2D-CNN backbone $f_B$ and a non-linear projection head g(•). The pair of frames of video $x_i$ correspond to projection $Z_i$ and $Z_i'$ in the representation space. The goal of the contrastive loss is to maximize the agreement between projection pair ($Z_i, Z_i'$) of the same video $x_i$, while maximizing the disagreement between projection pairs of different videos ($Z_i, Z_j$), where $j \neq i$. The NT-Xent contrastive loss for a batch of N videos is given in Equation 5:

$$L_B^i = -\log \frac{h(Z_i, Z_i')}{\sum_{j=1}^{N}[\mathbb{1}_{[j \neq i]} h(z_i, z_j) + h(z_i, z_j')]} \quad (5)$$

where $h(u, v) = \exp(u^T v/(\|u\|\|v\|\tau))$ is used to compute the similarity between u and v vectors with an adjustable parameter temperature, $\tau$, and where $\mathbb{1}_{[j \neq i]} \in \{0,1\}$ is an indicator function which equal 1 if $j \neq i$.

A goal of the system is to optimize the self-supervised system framework with the objective as shown in FIG. 3 where the anonymized video $f_A(x_i)$ 64 is first subjected to a temporal frame sampler $(S_F)$ 60, selecting two frames $S_F(f_A(x_i))$ 66 that are then projected into a representation space via a 2D-CNN backbone $(f_B)$ 68. This is followed by processing through a multilayer-projection head 70. The resulting projection pairs $Z_i$ and $Z'_i$, along with another set $Z_j$ and $Z'_j$ from a different anonymized video $f_A(x_j)$ 74 processed in parallel, are introduced into the representation space 72. The objective here is to use the NT-Xent contrastive loss to encourage similarity between projections of the same video (attracting $Z_i$ to $Z'_i$) while maximizing dissimilarity (repelling $Z_i$ from $Z_j$) between projections from different videos. This approach effectively enhances the model's ability to anonymize video content by disrupting semantically meaningful information that could compromise privacy, guided by the principle of maximizing agreement within projections of the same video and disagreement across different videos, as delineated in the accompanying text explanation.

Considering anonymization function $f_A$ parameterized by $\theta_A$, and auxiliary models $f_B$ and $f_T$ being parameterized by $\theta_B$ and $\theta_T$, respectively. Assuming $\alpha_A$, $\alpha_B$, and $\alpha_T$ represent the learning rates for $\theta_A$, $\theta_B$, and $\theta_T$, respectively; $\theta_A$ is initialized as given in Equation 6 unless $f_A$ reaches the threshold $th_{A0}$ reconstruction performance on the validation set:

$$\theta_A \leftarrow \theta_A - \alpha_A \nabla_{\theta_A}(\mathcal{L}_{L1}(\theta_A)) \quad (6)$$

One $\theta_A$ is initialized, it is utilized for initialization of $\theta_T$ and $\theta_B$ as shown in Equations 7 and 8 below, unless their performance reaches the loss values of $th_{B0}$ and $th_{T0}$:

$$\theta_T \leftarrow \theta_T - \alpha_T \nabla_{\theta_T}(L_T(\theta_T, \theta_A)) \quad (7)$$

$$\theta_B \leftarrow \theta_B - \alpha_B \nabla_{\theta_B}(L_B(\theta_B, \theta_A)) \quad (8)$$

After the initialization, a two-step iterative optimization process takes place. The first step, as depicted in the left side of FIG. 2, includes $\theta_A$ being updated using Equation 9:

$$\theta_A \leftarrow \theta_A - \alpha_A \nabla_{\theta_A}(L_T(\theta_A, \theta_T) - \omega L_B(\theta_A, \theta_B)) \quad (9)$$

where $\omega \in (0,1)$ is the relative weight of the self-supervised contrastive loss (SSL), $L_B$, with respect to the supervised action classification loss, $L_T$, with the negative sign before $L_B$ indicating a maximization. During the second step, as shown in the right side of FIG. 2, $\theta_T$ and $\theta_B$ are updated using Equations 7 and 8, respectively. $\theta_B$ is updated to obtain negative gradients during the next iteration's step-1. This two-step iterative optimization process continues until $L_B$ reaches a maximum value $th_{B_{max}}$.

Taking a model $f_b$ that is initialized with SSL pretraining, in an embodiment, $f_b$ is frozen when the contrastive loss is maximized, such that the input is changed to $f_b$ to decrease agreement between frames of the same video. Since it is known that frames of the same video share vast semantic information, minimizing agreement between frames of the same video results in destroying (or unlearning) most of the semantic information of the input video. Said another way, maximizing the contrastive loss results in destroying all highlighted attention map parts of video frames. Since this unlearned generic semantic information contains privacy attributes related to humans, scenes, and objects, the private information is removed from the input video; however, the system ensures that semantic information relating to action recognition remains in the output video through an action recognition branch of the system.

Training of the supervised privacy preserving action recognition method requires a video dataset $X^t$ with action labels $Y_T^t$ and privacy labels $Y_B^t$, where t denotes the training set. Since the self-supervised privacy removal framework does not require privacy labels, the system does not utilize $Y_B^t$. Once the training is finished, the anonymization function is frozen as $f_A^*$, and auxiliary models $f_T$ and $f_B$ are discarded. The evaluate the quality of the learned anonymization, $f_A^*$ is utilized to train: 1) a new action classifier $f_T'$ over the training set $(f_A^*(X^t), Y_T^t)$; and 2) a new privacy classifier $f_B'$ to train over $(f_A^*(X'), Y_B^t)$. The system does not utilize privacy labels for training $f_A$ in any protocol. Privacy labels are used only for the evaluation purpose to train the target model $f_B'$. Once the target models $f_T'$ and $f_B'$ finish training on the anonymized version of the training set, the target models are evaluated on the test sets $(f_A^*(X^e), Y_T^e)$ and $(f_A^*(X^e), Y_B^e)$, respectively, where e denotes the evaluation/test set. Test set performance of the action classifier is denoted as $A_B^1$ (classwise-mAP) or $A_B^2$ (classwise-$F_1$). The same-dataset training and evaluation protocol is shown in FIG. 13. For FIGS. 13, 14, and 15, it should be noted that these protocols are explained for a supervised method for general understanding. Specifically, our method does not utilize $Y_B^t$ (privacy labels) during our anonymization training.

Figure 13A:
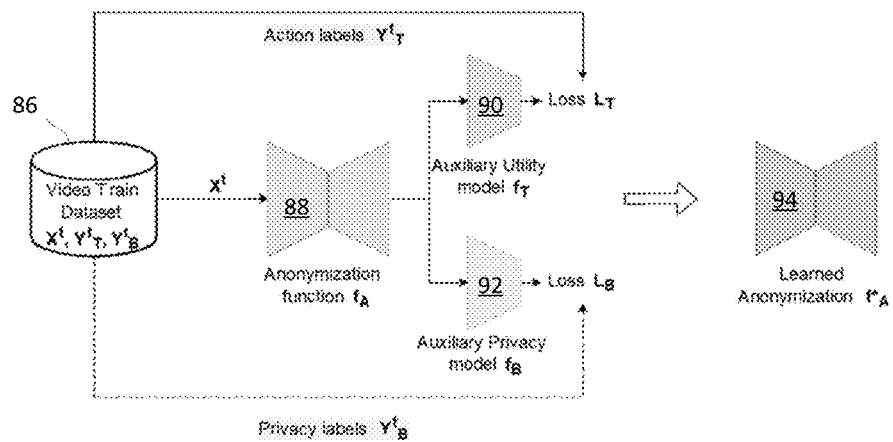
FIGS. 13*a*-*c* depict an embodiment of a same-dataset training an evaluation protocol, depicting a first phase training using anonymization function $f_A$ (in 13*a*); a second phase target model training (in 13*b*); and a third phase target model testing (in 13*c*).

In FIG. 13a, the process begins with the Video Train Dataset 86, which includes videos $X^t$, action labels $Y_T^t$ and privacy labels $Y_B^t$. These videos are processed by the anonymization function $f_A$ 88, aimed at preserving action-relevant information while obscuring personal details. The output feeds into both the Auxiliary Utility model $f_T$ 90 and the Auxiliary Privacy model $f_B$ 92, evaluated for action recognition accuracy and privacy preservation using losses $L_T$ and $L_B$, respectively. This iterative process refines $f_A$ towards a Learned Anonymization model $f_A^*$ 94.

Figure 13B:
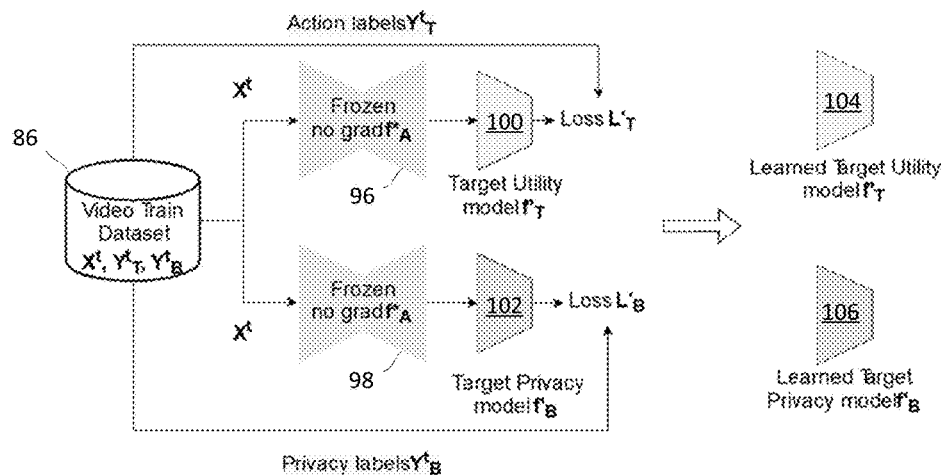

Moving to FIG. 13b, $f_A^*$ 96, 98 now serves as a static feature extractor to further refine the models. The Target Utility model $f_T'$ 100 and the Target Privacy model $f_B'$ 102 are trained on $X^t$ from the Video Train Dataset 86, focusing on minimizing action recognition loss $f_T'$ and privacy loss $L_B^*$. This leads to the creation of a Learned Target Utility model $f_T'$ 104 and a Learned Target Privacy model $f_B'$ 106, specifically tuned for utility and privacy objectives.

Figure 13C:
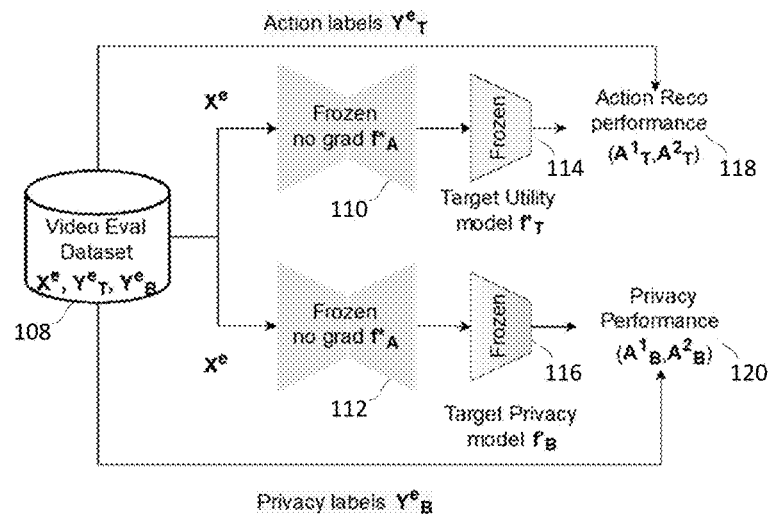

Finally, in FIG. 13c, the Video Eval Dataset 108, containing $X^e$, $Y_T^e$ and $Y_B^e$, is used to evaluate the final models. $f_A^*$ 110, 112 remains unchanged to test its anonymization capability in practice. The anonymized videos are then assessed by the Target Utility model $f_T'$ 114 and the Target Privacy model $f_B'$ 116. The models' efficacy is gauged through action recognition performance metrics $A_T^1$, $A_T^2$ 118 and privacy performance metrics $A_B^1$, $A_B^2$ 120, demonstrating the anonymization's real-world application.

In practice, a trainable-scale video dataset with action and privacy labels does not exist. In, the supervised training process was remedied by a cross-dataset training and/or evaluation protocol utilizing two different datasets: 1) an action annotated dataset $(X_{action}^t, Y_T^t)$ to optimize $f_A$ and $f_T$; and 2) a privacy annotated dataset $(X_{privacy}^t, Y_B^t)$ to optimize $f_A$ and $f_T$. After learning the $f_A$ through the different training sets, $f_A$ is frozen as $f_A^*$. A new action classifier $f_T'$ is trained on an anonymized version of the action annotated dataset $(f_A^*(X_{action}^t), Y_T^t)$, and a new privacy classifier $f_B'$ is trained on the anonymized version of the privacy annotated dataset $(f_A^*(X_{privacy}^t), Y_B^t)$. Once the target models $f_T'$ and $f_B'$ finish training on the anonymized version of the training set, the target models are evaluated on the test sets $(f_A^*(X_{action}^e), Y_T^e)$ and $(f_A^*(X_{privacy}^e), Y_B^e)$. The cross-dataset training and evaluation protocol is shown in FIG. 14.

Figure 14A:
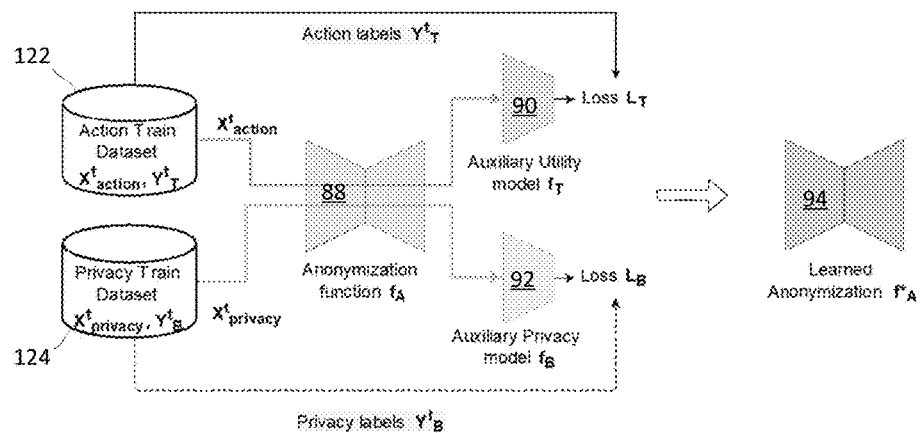
FIGS. 14*a*-*c* depict an embodiment of a cross-dataset training an evaluation protocol, depicting a first phase training using anonymization function $f_A$ (in 14*a*); a second phase target model training (in 14*b*); and a third phase target model testing (in 14*c*).

FIG. 14a outlines the initial training phase. The Action Train Dataset 122 and Privacy Train Dataset 124 provide videos $X_{action}^t$ and $X_{privacy}^t$, along with their respective action labels $Y_T^t$ and privacy labels $Y_B^t$. These videos are input into the anonymization function $f_A$ 88, which aims to retain action information while anonymizing personal data. The outputs are then evaluated by the Auxiliary Utility model $f_T$ 90 and Auxiliary Privacy model $f_B$ 92, using loss $L_T$ and $L_B$. The iterative optimization of $f_A$ leads to a Learned Anonymization model $f_A$ 94.

Figure 14B:
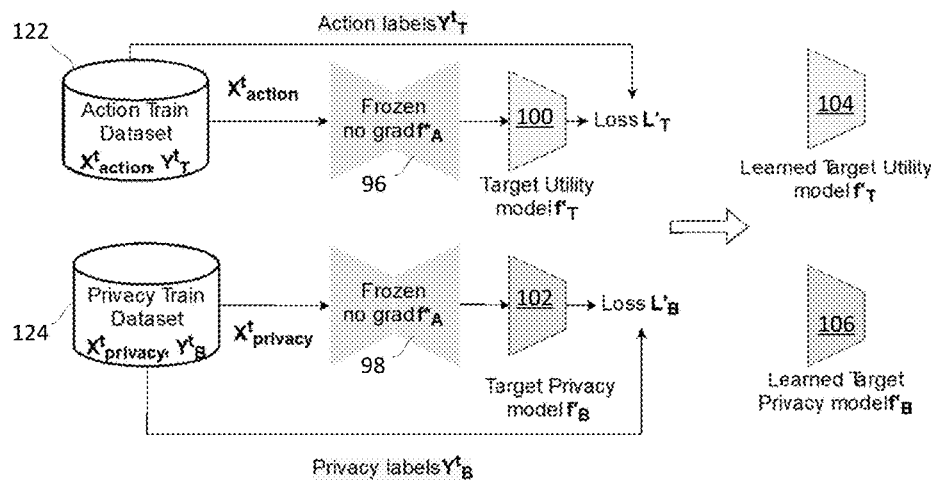

In the second phase, shown in FIG. 14b, $X_{action}^t$ and $X_{privacy}^t$ from the Action Train Dataset 122 and Privacy Train Dataset 124, respectively, are processed through the now static $f_A^*$ 96, 98, which no longer updates. This phase focuses on refining the Target Utility model $f_T'$ 100 and Target Privacy model $f_B'$ 102, aiming to minimize $L_T$ and $L_B$. The outcome is the Learned Target Utility model $f_T'$ 104 and Learned Target Privacy model $f_B'$ 106, specifically tuned for improved action recognition and privacy.

Figure 14C:
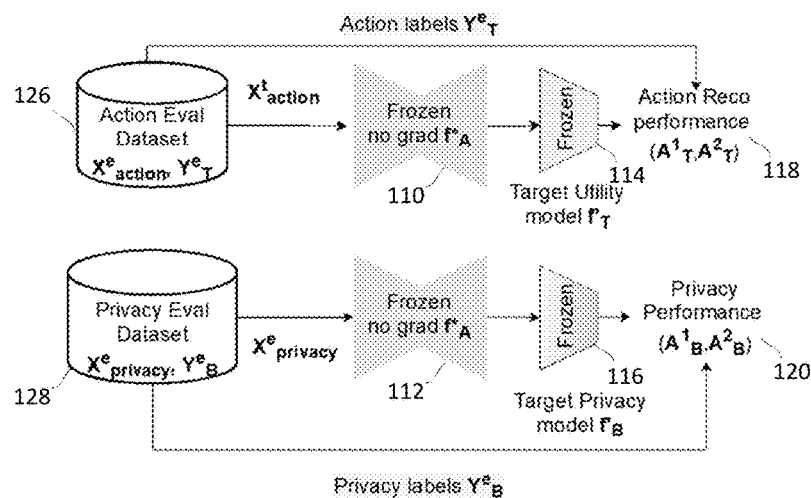

The final evaluation phase in FIG. 14c uses the Action Eval Dataset 126 and Privacy Eval Dataset 128, containing $X_{action}^e$, $X_{privacy}^e$, and their respective labels $Y_T^e$ and $Y_B^e$. The static $f_A^*$ 110, 112 processes videos for evaluation by the Target Utility model $f_T'$ 114 and Target Privacy model $f_B'$ 116. Performance is measured by action recognition metrics $A_T^1$, $A_T^2$ 118 and privacy metrics $A_B^1$, $A_B^2$ 120, showcasing the real-world effectiveness of the models.

For the two protocols discussed above, the same training set $X^t$ ($X_{action}^t$ and $X_{privacy}^t$) is used for the target models $f_T'$, $f_B'$ and learning the anonymization function $f_A$. However, a learned anonymization function $f_A^*$ is expected to generalize on any action or privacy attributes. To evaluate the generalization on novel action, an anonymized version of the novel action set $f_A^*(X_{privacy}^{nt})$, such that $Y_T^t \cap Y_B^t = \phi$ (where nt represents novel training) is used to train the privacy target model $f_B'$, and its performance is measured on a novel privacy test set $f_A^*(X_{privacy}^{ne})$ (where ne represents novel evaluation). The novel action and privacy attribution protocol training and evaluation is shown in FIG. 15.

Figure 15A:
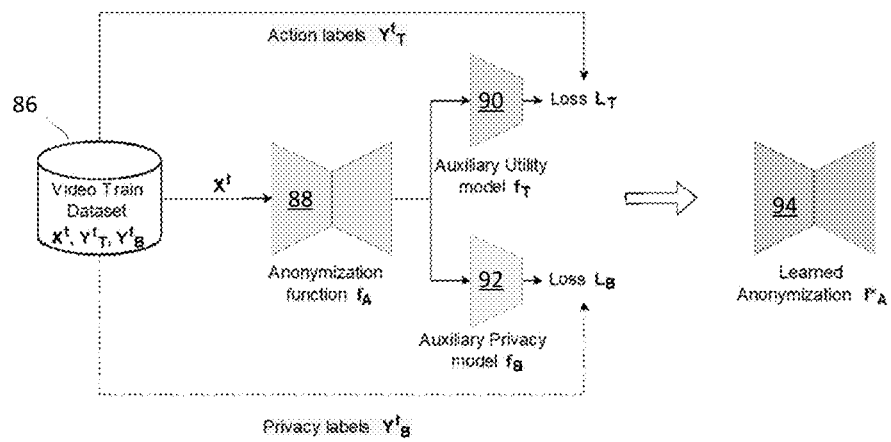
FIGS. 15*a*-*c* depict an embodiment of a novel-dataset training an evaluation protocol, depicting a first phase training using anonymization function $f_A$ (in 15*a*); a second phase target model training (in 15*b*); and a third phase target model testing (in 15*c*).
Figure 15B:
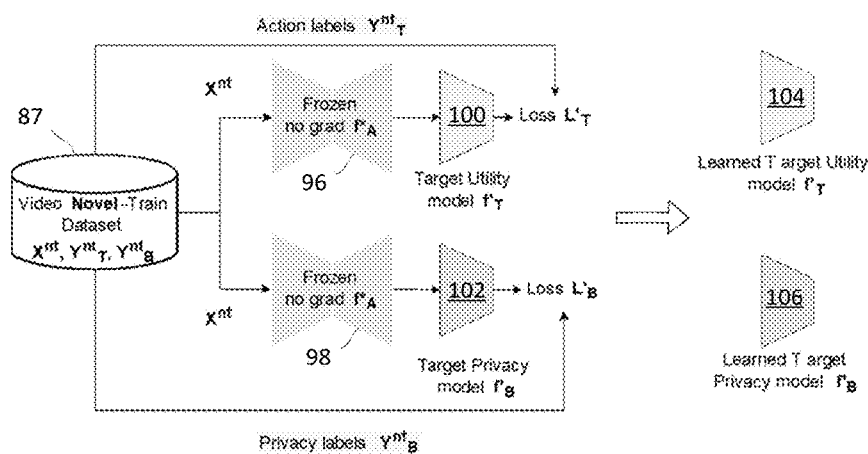
Figure 15C:
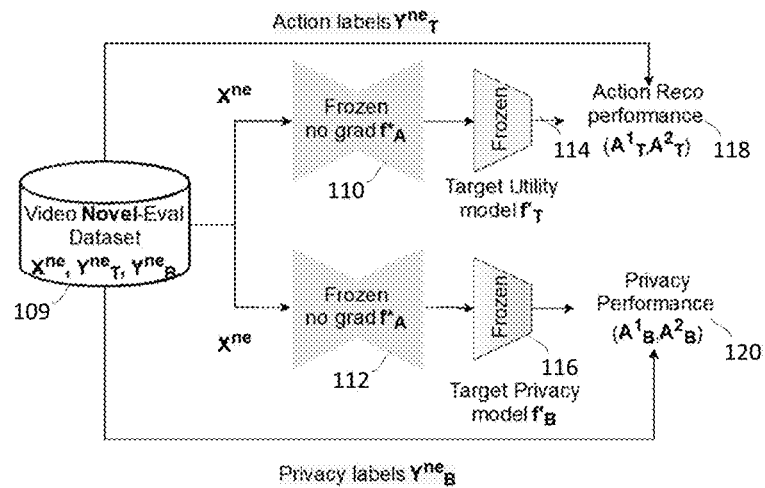

FIG. 15a is similar to FIG. 14a but presents a single Video Train Dataset 86, where videos $X^t$ along with action labels $Y_T^t$ and privacy labels $Y_B^t$ are processed by the anonymization function $f_A$ 88. This setup simplifies the initial training stage by combining action and privacy data sources, with the subsequent processes and optimization goals remaining consistent. FIG. 15b corresponds to FIG. 14b. In this phase uses the Video Novel-Train Dataset 87 to refine the Target Utility model $f_T'$ 100 and Target Privacy model $f_B'$ 102 with $X^{nt}$, utilizing the previously optimized $f_A^*$ 96, 98. The process culminates in the Learned Target Utility model $f_T'$ 104 and Learned Target Privacy model $f_B'$ 106, optimized for new, unseen datasets. The evaluation stage shown in FIG. 15c uses the Video Novel-Eval Dataset 109 and follows the structure of FIG. 14c, assessing the effectiveness of the anonymization and model training on novel evaluation data $X^{ne}$, with performance indicators $A_T^1$, $A_T^2$ 118 for action and $A_B^1$, $A_B^2$ 120 for privacy, evaluated by the refined models $f_T'$ and $f_B'$.

Experimental Methods

Different datasets were evaluated using the system and method described in detail above. These datasets include the UCF101 set; the HMDB51 set; the PA-HMDB set; the P-HVU selected subset of the LSHVU set (with the subset being selected for including action-object-scene levels to create the train/test split); and the VISPR set (with subsets shown in Table 7).

For a default experiment setting, UNet is utilized as $f_A$; R3D-18 is utilized as $f_T$; and ResNet-50 is utilized as $f_B$. For a fair evaluation, results of different methods are reported using the same training augmentations and model architectures. Two different sets of augmentations were applied depending on the loss function: 1) for supervised losses, standard augmentations (random crop, random scaling, horizontal flip, and random gray-scale conversion) with less strength were used; 2) for self-supervised loss, in addition to the standard augmentations with more strength, random color jitter, random cutout, and random color drop were used. To ensure temporal consistency in a clip, the same augmentation was applied on all frames of the clips. All video frames or images are resized to 112×112; input videos include 16 frames with a skip rate of 2.

A base learning rate of 1e-3 was used with a learning rate scheduler, which drops the learning rate to its $1/10^{th}$ value on the loss plateau. For self-supervised privacy removal branch, the 128-D output was used as a representation vector to compute contrastive loss of temperature $\tau=0.1$. For the RotNet experiment, 4 rotations were used: $\{0, 90, 180, 270\}$.

An Adam optimizer was used to optimize parameters of different neural networks. For initialization, $f_A$ was trained for 100 epochs using $\mathcal{L}_1$ reconstruction loss, action recognition auxiliary model $f_T$ was trained using cross-entropy loss for 150 epochs, and privacy auxiliary model $f_B$ was trained using NT-Xent loss for 400 epochs. The training phase of anonymization function $f_A$ is carried out for 100 epochs, whereas target utility model $f_T'$ and target privacy model $f_B'$ are trained for 150 epochs.

Macro-average of classwise mean average precision (cMAP) is used to evaluate the performance of target privacy model $f_B'$. The results are also reported in average F1 score across privacy classes. F1 score for each class is computed at confidence 0.5. For action recognition, a top-1 accuracy is used that is computed from video-level prediction from the model and groundtruth. A video-level prediction is an average prediction of 10 equidistant clips from a video.

Downsampling methods are adopted with down-sampled versions of input resolution with a factor of 2× and 4× used in training and testing. Obfuscation methods are carried out using a MS-COCO pretrained Yolo object detector to detect person categories. The detected persons are removed using two different obfuscation strategies: 1) blackening the detected bounding boxes, and 2) applying Gaussian blur in the detected bounding boxes at two different strengths.

The two existing protocols from were used to evaluate for known action and privacy attributes using UCF101-VISPR cross dataset training and evaluation, and using HMDB51-VISPR cross dataset training and PA-HMDB evaluation. For the UCF101-VISPR protocol, $X_{action}^t$=UCF101 trainset and $X_{action}^e$=UCF101 testset, with $X_{privacy}^t$=VISPR trainset and $X_{privacy}^e$=VISPR testset. For the HMDB51-VISPR cross dataset training and PA-HMDB evaluation, $X_{action}^t$=HMDB51 trainset and $X_{action}^e$=PA-HMDB, with $X_{privacy}^t$=VISPR trainset and $X_{privacy}^e$=PA-HMDB.

In addition, a new protocol from the system and method described in detail above is evaluated using a P-HVU dataset from same-domain training and testing. In this protocol, the utility task is multi-label action recognition and privacy is defined in terms of object and scene multi-label classification. In this protocol, $X^t$=P-HVU trainset, and $X^e$=P-HVU testset.

As shown in Table 1, the self-supervised framework from the system and method achieves a comparable action-privacy trade-off in the case of known action and privacy attributes. Other methods, such as Downsample-4x, Obf-blackening, and Obf-StrongBlur achieve commendable privacy removal but at a cost of action recognition performance.

In VISPR-1→2, the domain shift is very small, and hence is able to generalize and perform within approximately 5% of the self-supervised system and method; however, in PHVU Scene→Obj, the domain shift is large, and suffers in generalizing and performs significantly worse than the self-supervised system and method (i.e., greater than approximately 40% worse).

TABLE 1

| Method | UCF101 Action Top-1 (↑) | VISPR1 Privacy cMAP (↓) | VISPR1 Privacy F1 (↓) | PA-HMDB Action Top-1 (↑) | PA-HMDB Privacy cMAP (↓) | PA-HMDB Privacy F1 (↓) | P-HVU Action cMAP (↑) | P-HVU Objects cMAP (↓) | P-HVU Scenes cMAP (↓) |
|---|---|---|---|---|---|---|---|---|---|
| Raw data | 62.33 | 64.41 | 0.555 | 43.6 | 70.1 | 0.401 | 20.1 | 11.90 | 25.8 |
| Downsample-2x | 54.11 | 57.23 | 0.483 | 36.1 | 61.2 | 0.111 | 10.9 | 2.45 | 8.6 |
| Downsample-4x | 39.65 | 50.07 | 0.379 | 25.8 | 41.4 | 0.081 | 0.78 | 0.89 | 1.76 |
| Obf-Blackening | 53.13 | 56.39 | 0.457 | 34.2 | 63.8 | 0.386 | 8.6 | 6.12 | 22.1 |
| Obf-StrongBlur | 55.59 | 55.94 | 0.456 | 36.4 | 64.4 | 0.243 | 11.3 | 6.89 | 22.8 |
| Obf-WeakBlur | 61.52 | 63.52 | 0.523 | 41.7 | 69.4 | 0.398 | 18.6 | 11.33 | 25.4 |
| Noise-Features | 61.90 | 62.40 | 0.531 | 41.5 | 69.1 | 0.384 | — | — | — |
| Supervised | 62.10 | 55.32 | 0.461 | 42.3 | 62.3 | 0.194 | 18.33 | 1.98 | 9.5 |
| Ours | 62.03 | 57.43 | 0.473 | 43.1 | 62.7 | 0.176 | 18.01 | 1.42 | 9.91 |

Figure 4:
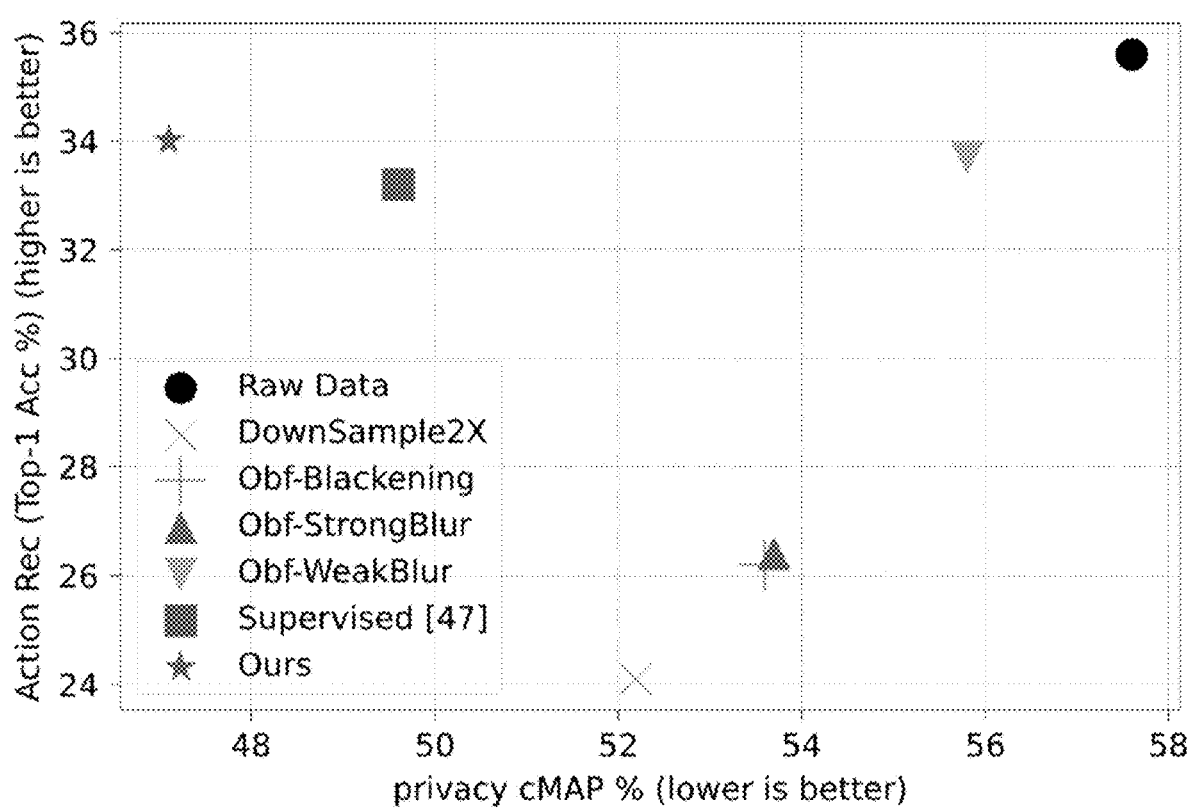
FIG. 4 graphically depicts a trade-off between action classification and privacy removal for existing privacy preserving action recognition methods and for a self-supervised privacy preserving action recognition system and method.
Figure 6A:
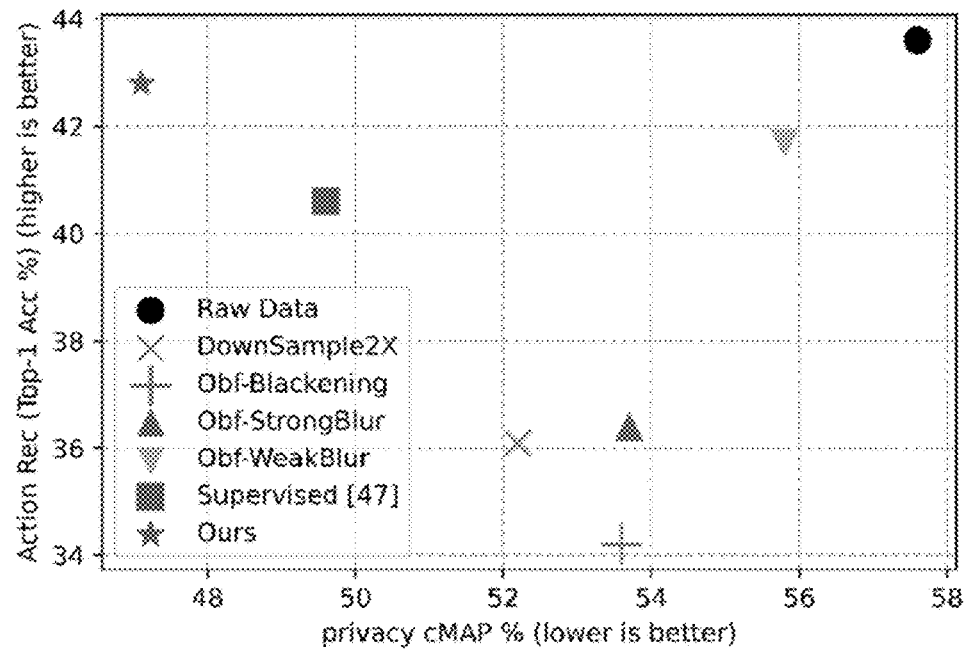
FIGS. 6*a*-*b* graphically depict a trade-off between action classification and privacy removal while generalizing from different datasets.
Figure 6B:
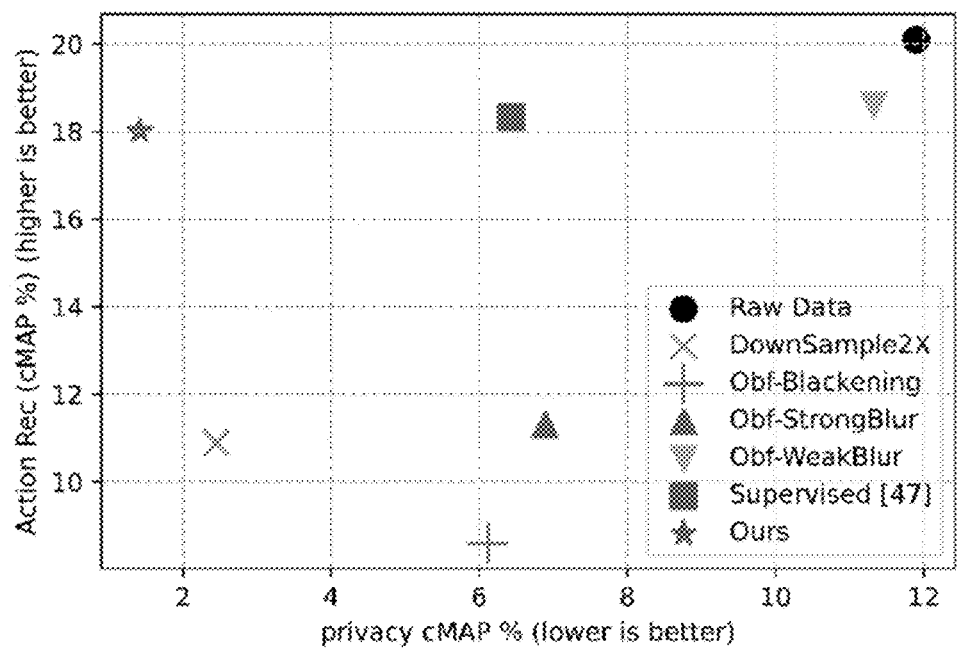
Figure 7A:
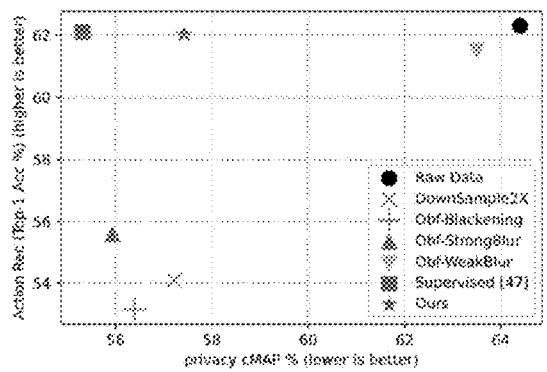
FIGS. 7*a*-*d* graphically depict a trade-off between action classification and privacy classification for different datasets.
Figure 7B:
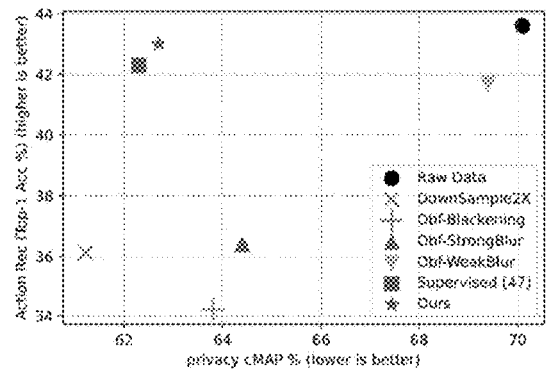
Figure 7C:
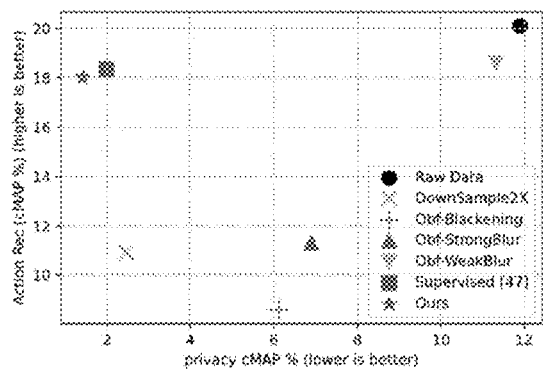
Figure 7D:
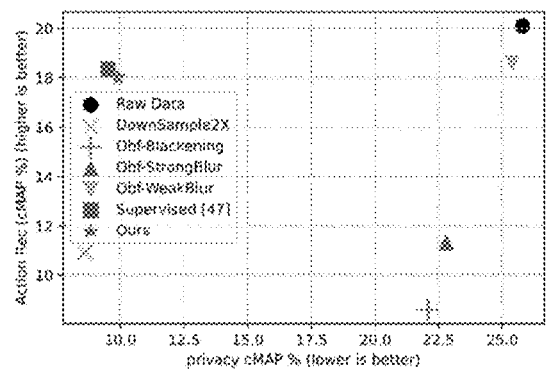

To evaluate the case of novel actions and novel privacy attributes, the following sets are used: 1) for actions, $X_{action}^t$=UCF101 trainset, $X_{action}^{nt}$=HMDB51 trainset, and $X_{action}^{ne}$=HMDB51 testset/PA-HMDB; and 2) for privacy, $X_{privacy}^t$=VISPR-1 trainset, $X_{privacy}^{nt}$=VISPR-2 trainset, and $X_{privacy}^{ne}$=VISPR-2 testset. From the left part of Table 2 and from the graph of FIG. 4, the system and method is shown to outperform the supervised method in both action and privacy attribute generalization. In addition, FIGS. 6a-b depict a trade-off plot for evaluating learned $f_A^*$ for novel action-privacy attributes, and FIGS. 7a-d depict a trade-off plot for evaluating learned $f_A^*$ for known action-privacy attributes.

The following sets were used to evaluate detection of novel privacy attributes from scenes to objects: known action set $X_{action}^t$=P-HVU trainset, $X_{action}^e$=P-HVU testset, $X_{privacy}^t$=P-HVU trainset Object, $X_{privacy}^{nt}$=P-HVU trainset Scene, and $X_{privacy}^{ne}$=P-HVU testset Scene.

TABLE 3

| $f_A$ | $f_B$ | UCF101 Top-1 (↑) | VISPR1 cMAP (↓) | VISPR1 F1 (↓) |
|---|---|---|---|---|
| ✗ | ✗ | 62.3 | 64.4 | 0.555 |
| ✓ | ✗ | 63.5 | 64.1 | 0.549 |
| ✓ | Spatial (Frozen) | 62.2 | 62.2 | 0.535 |
| ✓ | Spatial | 62.1 | 57.4 | 0.473 |
| ✓ | Spatio-Temporal | 56.4 | 56.6 | 0.461 |

The second row in Table 3 shows the results using only an encoder-decoder based model $f_A$ without using any privacy removal branch $f_B$. However, the style changing fails to anonymize privacy information. As such, a pretrained SSL frozen model was then used to anonymize the privacy information by Equation 9. This method of freezing $f_B$ is able to remove the privacy information by a small extent

TABLE 2

| Method | Transfer Evaluation: Action UCF→HMDB Top-1(%) (↑) | Transfer Evaluation: Action UCF→PA-HMDB Top-1(%) (↑) | Transfer Evaluation: Privacy VISPR1→VISPR2 cMAP(%) (↑) | Transfer Evaluation: Privacy VISPR1→VISPR2 F1 (↓) | Transfer Evaluation P-HVU Action cMAP(%) (↑) | Transfer Evaluation P-HVU Scenes → Obj cMAP(%) (↓) |
|---|---|---|---|---|---|---|
| Raw data | 35.6 | 43.6 | 57.6 | 0.498 | 20.1 | 11.9 |
| Downsample-2x | 24.1 | 36.1 | 52.2 | 0.447 | 10.9 | 2.45 |
| Downsample-4x | 16.8 | 25.8 | 41.5 | 0.331 | 0.78 | 0.89 |
| Obf-Blackening | 26.2 | 34.2 | 53.6 | 0.46 | 8.6 | 6.12 |
| Obf-StrongBlur | 26.4 | 36.4 | 53.7 | 0.462 | 11.3 | 6.89 |
| Obf-WeakBlur | 33.7 | 41.7 | 55.8 | 0.486 | 18.6 | 11.33 |
| Noisy Features | 31.2 | 41.5 | 53.7 | 0.458 | — | — |
| Supervised | 33.2 | 40.6 | 49.6 | 0.399 | 18.34 | 6.43 |
| Ours | 34.1 | 42.8 | 47.1 | 0.386 | 18.01 | 1.42 |

From the right side of Table 2, it is observed that while testing the learned anonymization from scenes to objects, the supervised method achieves a similar result to Obf-StrongBlur and removes only approximately 46% of the raw data's privacy, whereas the self-supervised framework from the system and method removes approximately 88% object privacy of the raw data. This privacy removal gain is due to the amount of domain shift in the novel privacy attributes.

(<2%); however, the biggest boost in privacy removal (7%) resulted from updating $f_B$ with every update in $f_A$, as can be seen in the fourth row of Table 3. This shows the importance of updating the $f_B$ in the second step (Equation 8) of the minimax optimization. Said another way, if $f_B$ is not updated with $f_A$, then $f_A$ can maximize $f_B$, leading to poor privacy removal. In addition, a spatio-temporal SSL framework was tested as a privacy removal branch; however, removing spatio-temporal semantics from the input video leads to severe degradation in action recognition performance.

TABLE 4

| Distance between positive frames | UCF101 Top-1 (%) (↑) | VISPR1 cMAP (%) (↓) | F1 (↓) |
|---|---|---|---|
| No constraint | 62.1 | 57.4 | 0.473 |
| >64 frames | 62.1 | 58.7 | 0.488 |
| <8 frames | 63.4 | 57.1 | 0.443 |

In order to experiment with various temporal samplers ($S_F$) for choosing a pair of frames from a video, the duration (distance) between the two frames is changed, as shown in Table 4. The chosen pair of frames from a video is considered for the positive term of contrastive loss (Equation 5). In the default setting of experiments, a pair of frames is randomly selected from a video, as shown in the first show of Table 4. It is observed that mining positive frames from further distances decreases the anonymization capability, due to the dissimilar positives in contrastive loss leading to poorly learned representations [11, 35].

TABLE 5

| | UCF101 | VISPR1 | |
|---|---|---|---|
| SSL Loss | Top-1 (%) (↑) | cMAP (%) (↓) | F1 (↓) |
| NT-Xent [4] | 62.1 | 57.4 | 0.473 |
| MoCo [17] | 61.4 | 57.1 | 0.462 |
| RotNet [14] | 58.1 | 60.2 | 0.504 |

As shown in Table 5, three different 2D SSL schemes were explored using Equation 5. It was observed that NT-Xent and MoCo achieve comparable performances; however, the RotNet framework provides a suboptimal performance in both utility and privacy, likely because RotNet encourages learning global representations and heavily removes the global information from the input via the privacy removal branch, leading to a drop in the action recognition performance.

TABLE 6

| | UCF101 | VISPR1 | |
|---|---|---|---|
| $f_B$ architecture | Top-1 (↑) | cMAP (↓) | F1 (↓) |
| MobileNetV1 (MV1) | 62.1 | 58.14 | 0.488 |
| ResNet50 (R50) | 62.1 | 57.43 | 0.473 |
| R50 + MV1 | 61.4 | 56.20 | 0.454 |

To understand the effect of the auxiliary model $f_B$ in the training process of $f_A$ different privacy models $f_B$ were tested and the performance of each learned $f_A^*$ is reported in the same evaluation setting, as shown in Table 6 (with additional results shown in Table 13). It was observed that using a better architecture of $f_B$ results in better anonymization. There is no significant effect of using different architectures of $f_T$ in learning $f_A$.

TABLE 7

| VISPR1 [ ] | VISPR2 |
|---|---|
| a17_color | a6_hair_color |
| a4_gender | a16_race |
| a9_face_complete | a59_sports |
| a10_face_partial | a1_age_approx |
| a12_semi_nudity | a2_weight_approx |
| a64_rel_personal | a73_landmark |
| a65_rel_soci | a11_tattoo |

In addition, the self-supervised privacy preserving action recognition framework was tested by directly evaluating $f_A^*$ using a privacy target model pretrained on raw data, rather than learning a target privacy model $f_B'$ from the anonymized version of the training data. Results are shown in Table 8, in which a ResNet-50 model was used as a privacy target model which is pretrained on raw training data of the respective evaluation set.

TABLE 8

| | VISPR1 | | VISPR2 | | PA-HMDB | |
|---|---|---|---|---|---|---|
| Method | cMAP (%)(↓) | F1(↓) | cMAP (%)(↓) | F1(↓) | cMAP (%) (↓) | F1(↓) |
| Raw data | 64.40 | 0.5553 | 57.60 | 0.4980 | 70.10 | 0.4010 |
| Downsample-2× | 51.23 | 0.4627 | 46.39 | 0.4330 | 60.04 | 0.2403 |
| Downsample-4× | 38.82 | 0.3633 | 33.42 | 0.3055 | 0.59 | 0.2630 |
| Obf-Blackening | 48.38 | 0.3493 | 44.01 | 0.3134 | 55.66 | 0.0642 |
| Obf-StrongBlur | 54.44 | 0.4440 | 50.31 | 0.3990 | 60.13 | 0.2830 |
| Supervised | 22.81 | 0.2437 | 26.61 | 0.1840 | 57.01 | 0.2310 |
| Ours | 27.44 | 0.0760 | 20.02 | 0.0460 | 58.90 | 0.0940 |

Compared to other methods, the supervised and the self-supervised system and method achieved a great deal of privacy classification drop, which is desired to prevent privacy leakage; in addition, the self-supervised system and method achieved competitive cMAP performance as compared with and outperforms regarding F1 score.

Moreover, using R3D-18 as an auxiliary action recognition model $f_T$ in training the anonymization function, the learned $f_A^*$ was evaluated to train different action recognition (utility) target models, such as R3D-18, C3D, R2plus1D-18 from scratch, and Kinetics-400 pretraining. Results are shown in Table 9, in which the self-supervised system and method maintains the action recognition performance on any utility action recognition model.

TABLE 9

| Method | R3D-18 | R2Plus1D | R2Plus1D K400 pretraining | C3D |
|---|---|---|---|---|
| Raw data | 62.3 | 64.33 | 88.76 | 58.51 |
| Supervised | 62.1 | 62.58 | 85.33 | 56.30 |
| Ours | 62.03 | 62.71 | 85.14 | 56.10 |

ResNet-50 was also used as an auxiliary privacy model $f_B$ to evaluate the learned anonymization $f_A^*$ on target privacy classifiers $f_B'$ like ResNet18/50/34/101/152 and MobileNet-V1 with and without ImageNet pretraining.

TABLE 10

| | ResNet18 | | ResNet34 | | ResNet50 | | Reset101 | | ResNet152 | | MobileNet-V1 | |
|---|---|---|---|---|---|---|---|---|---|---|---|---|
| Method | cMAP (%)(↓) | F1(↓) | cMAP (%) | F1 | cMAP (%) | F1 | cMAP (%) | F1 | cMAP (%) | F1 | cMAP (%) | F1 |
| Raw data | 64.38 | 0.5385 | 65.30 | 0.5554 | 64.40 | 0.5553 | 60.70 | 0.5269 | 58.83 | 0.4852 | 61.21 | 0.5056 |
| Supervised | 53.84 | 0.4402 | 53.22 | 0.4283 | 53.97 | 0.4459 | 53.55 | 0.4257 | 51.05 | 0.4030 | 52.48 | 0.4013 |
| Ours | 54.83 | 0.4574 | 54.09 | 0.4226 | 57.43 | 0.4732 | 52.94 | 0.4096 | 53.27 | 0.4322 | 53.41 | 0.3974 |

As shown in Table 10, the self-supervised system and method protects privacy leakage regardless of choice of target privacy model. Using ImageNet pretraining as shown in Table 11, privacy leakage increases in all methods; however, the relative drop to the raw data baseline is improved in the self-supervised system and method.

TABLE 11

| | ResNet18 | | ResNet34 | | ResNet50 | | ResNet101 | | ResNet152 | |
|---|---|---|---|---|---|---|---|---|---|---|
| Method | cMAP (%) | F1 | cMAP (%) | F1 | cMAP (%) | F1 | cMAP (%) | F1 | cMAP (%) | F1 |
| Raw data | 69.82 | 0.6041 | 69.55 | 0.6447 | 70.66 | 0.6591 | 71.09 | 0.6330 | 69.50 | 0.6130 |
| Supervised | 58.05 | 0.5367 | 58.02 | 0.5463 | 62.01 | 0.5281 | 61.44 | 0.5553 | 61.88 | 0.5711 |
| Ours | 59.10 | 0.5302 | 59.71 | 0.5227 | 60.73 | 0.5689 | 59.24 | 0.5601 | 60.51 | 0.5352 |

Figure 5:
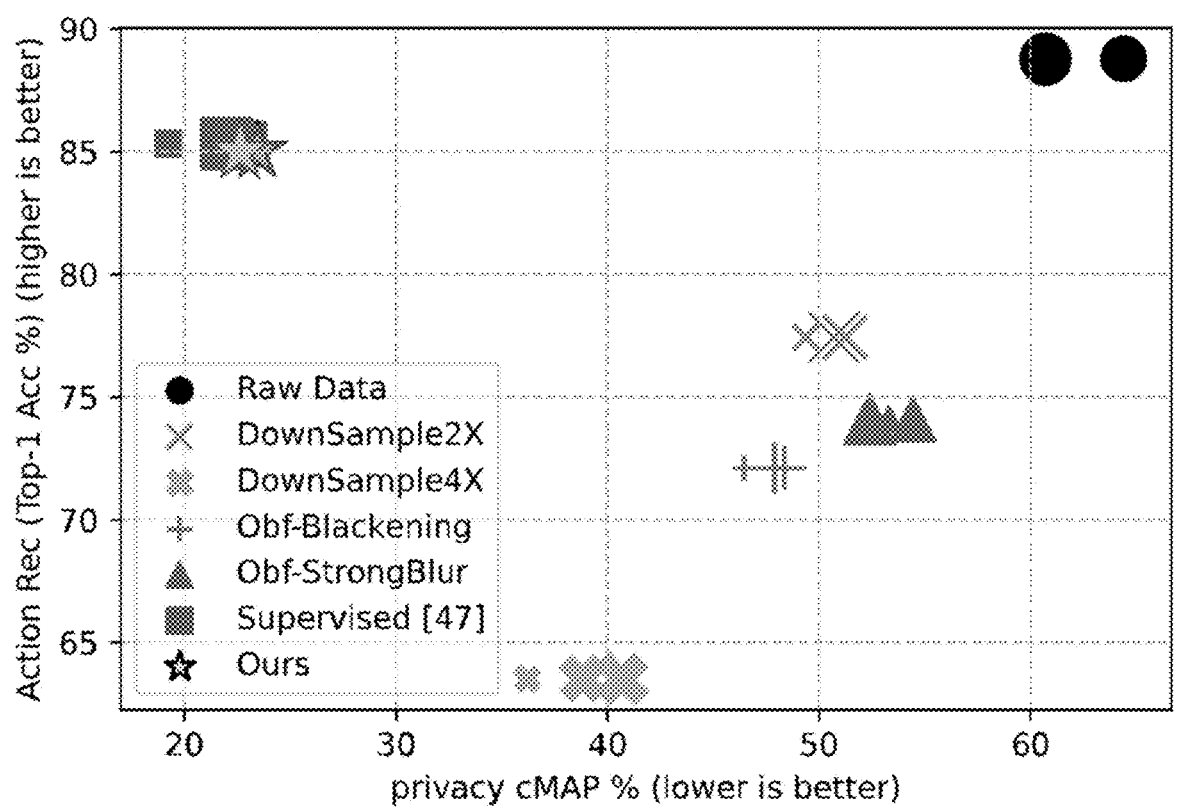
FIG. 5 is a graphical depiction of a trade-off between action classifications using pretrained action classifiers and raw-data frozen privacy classifiers.

In a practical scenario, an action recognition target model $f_T'$ is initialized from the Kinetics400 raw data pretrained checkpoint. Since an intruder has no direct access to the learned anonymization function in a practical setting, the raw data pretrained privacy classifier can be considered as a target privacy model $f_B$. Results are shown in the graph shown in FIG. 5 and in Table 12, in which a Kinetics400 pretrained R2Plus1D-18 model was used as the action recognition target model $f_T'$ and a ResNet model with carrying capacity was used as the target privacy model $f_B'$.

TABLE 12

| | Top-1 Acc | cMAP (%) (↓) | | |
|---|---|---|---|---|
| Method | (%) (↑) | ResNet18 | ResNet50 | ResNet101 |
| Raw data | 88.76 | 64.38 | 64.40 | 60.70 |
| Downsample-2x | 77.45 | 49.37 | 51.23 | 50.72 |
| Downsample-4x | 63.53 | 36.22 | 38.82 | 40.68 |
| Obf-Blackening | 72.11 | 46.48 | 48.38 | 47.92 |
| Obf-StrongBlur | 74.10 | 53.30 | 54.44 | 52.39 |
| Supervised | 85.33 | 19.23↓70% | 22.81↓64% | 22.01↓64% |
| Ours | 85.01 | 22.16↓66% | 23.44↓64% | 22.64↓63% |

At the cost of a small drop in action recognition performance, the self-supervised system and method obtains approximately 66% reduction in privacy leakage as compared to the raw data baseline.

TABLE 13

| | UCF101 | VISPR1 | |
|---|---|---|---|
| $f_T$ architecture | Top-1(%) (↑) | cMAP(%) (↓) | F1 (↓) |
| R3D-18 | 62.03 | 57.43 | 0.4732 |
| R2 + 1D-18 | 62.37 | 57.37 | 0.4695 |
| R3D-50 | 62.58 | 57.51 | 0.4707 |

Various test set videos of UCF101 were used to visualize the transformation due to the learned anonymization function $f_A^*$. The sigmoid function after $f_A^*$ ensures a range of (0,1) for the output image. The output was visualized at different stages of anonymization training, as shown in FIGS. 8, 9, 10, showing the successful anonymization using the self-supervised system and method as training progressed.

Figure 8:
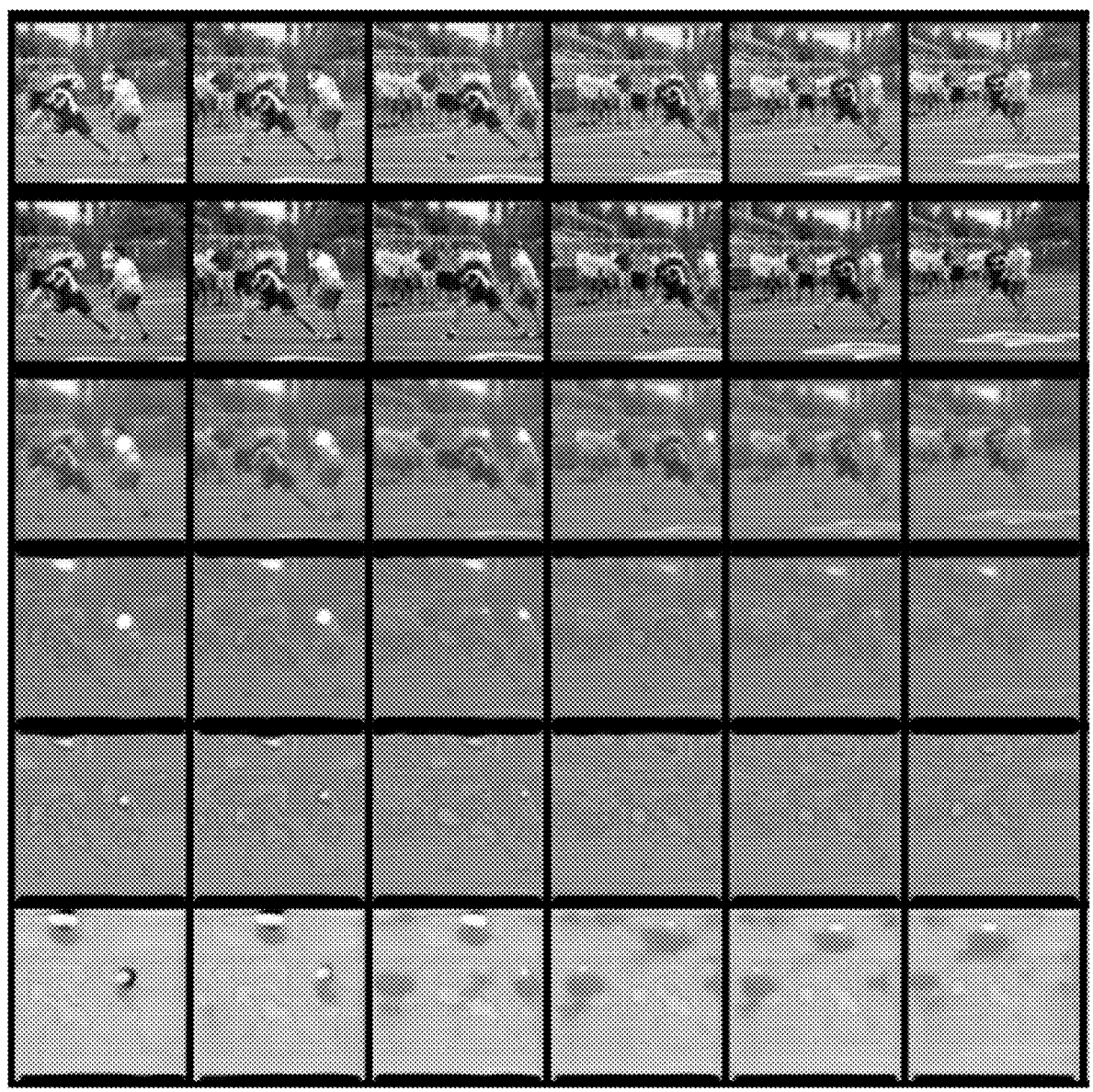
FIG. 8 depicts learned anonymization using a self-supervised privacy preserving action recognition system and method.
Figure 9:
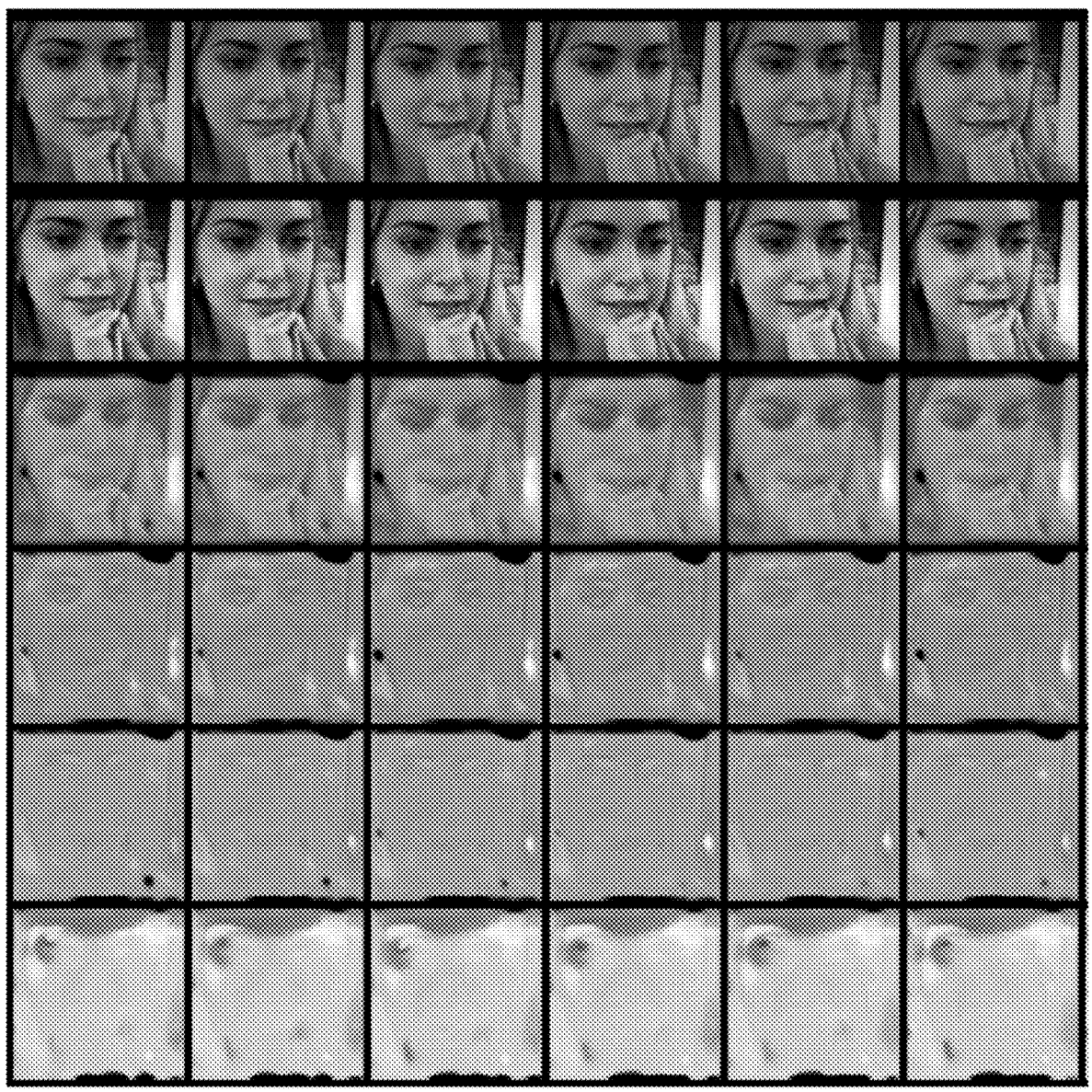
FIG. 9 depicts learned anonymization using a self-supervised privacy preserving action recognition system and method.
Figure 10:
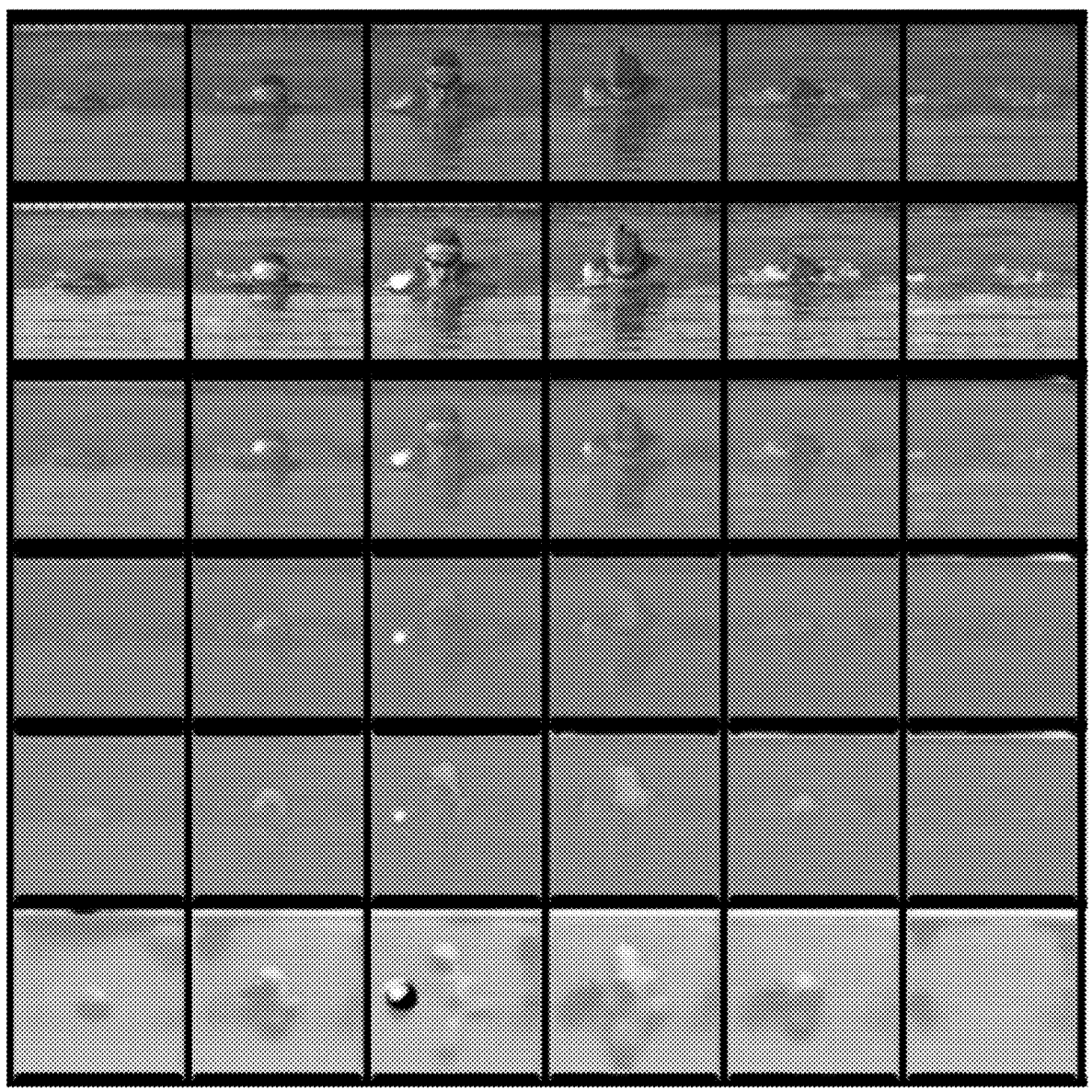
FIG. 10 depicts learned anonymization using a self-supervised privacy preserving action recognition system and method.

FIGS. 8, 9, and 10 from the document present the evolution of the self-supervised privacy preservation system as applied to different actions within the UCF101 test set. These figures showcase the system's learned anonymization process over various epochs of training, illustrated through different stages of video anonymization.

In FIG. 8, the system's performance is demonstrated on the "Frisbee Catch" action. The first row displays the original video frames, capturing the essence of the activity without any modification. Subsequent rows show the anonymized versions of the video at epochs 1, 3, 6, 9, and 30. As the epochs progress, the system gradually enhances its anonymization techniques, effectively removing identifiable features while retaining essential movement cues necessary for action recognition. This staged representation illustrates the balance the system seeks between privacy preservation—by obscuring personal and spatial details—and maintaining the capability of performing action recognition.

FIG. 9 exhibits a similar progression for the "Apply Lipstick" action. Again, the initial row portrays untouched video frames, with the following rows depicting the incremental anonymization process. This particular example underscores the system's capability to handle diverse scenarios within the same dataset, adapting its anonymization function to different contexts and actions. The gradual transformation across epochs reveals how the system learns to identify and minimize privacy-sensitive elements while keeping the action distinguishable.

FIG. 10 focuses on the "Breaststroke" action, further emphasizing the framework's adaptability and effectiveness across varied activities. The original video frames are shown first, followed by their progressively anonymized counterparts over selected training epochs. This figure reinforces the framework's utility in handling dynamic and complex movements associated with sports or physical activities. The anonymized frames illustrate how the system preserves the fluidity and identifiable patterns of the swim stroke, despite the increasing obfuscation of individual features and surroundings.

Overall, these figures collectively demonstrate the self-supervised privacy preservation framework's ability to learn and apply context-sensitive anonymization across different actions and scenarios. The system effectively balances the dual objectives of maintaining action recognition accuracy while significantly reducing privacy risks, showcasing its potential application in sensitive environments where both privacy and action understanding are paramount.

A self-supervised model focuses on holistic spatial semantics, whereas a supervised privacy classifier focuses on specific semantics of the privacy attributes. To bolster this observation, the attention map of ResNet50 model was visualized which is trained in 1) a supervised manner using binary cross entropy loss using VISPR-1; and 2) a self-supervised manner using NT-Xent loss. The method of Zagoruyko and Komodakis was used to generate model attention from the third convolutional block of the ResNet model.

Figure 11A:
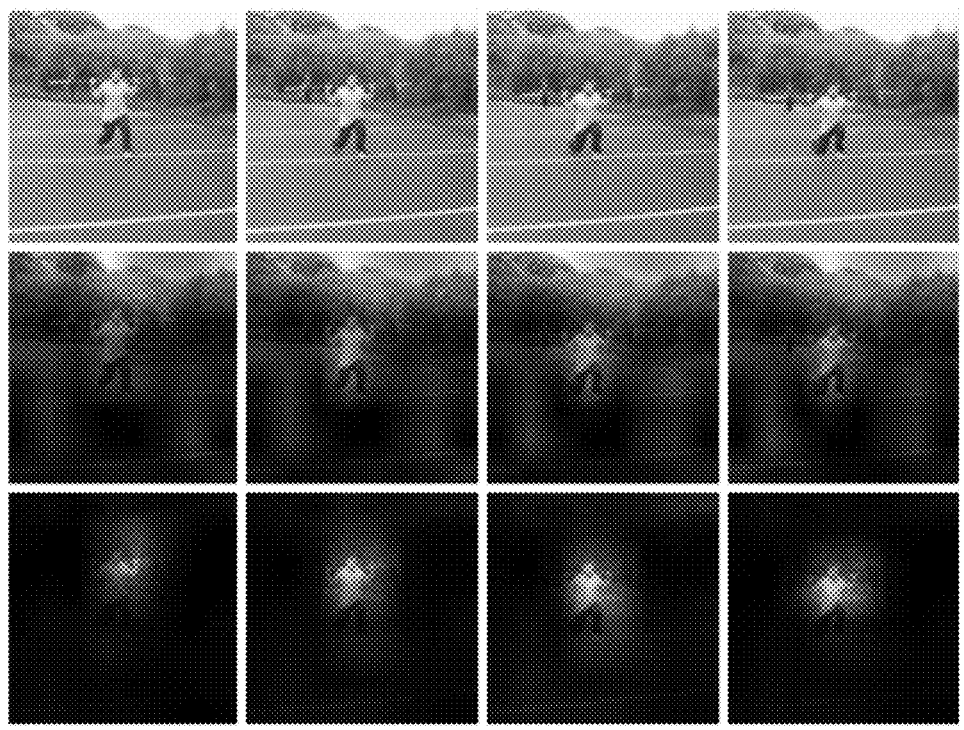
FIGS. 11*a*-*b* depict the visualization of attention maps where the top row displays the original video, the middle row shows the attention of a self-supervised model, and the bottom row illustrates the attention of a supervised privacy classifier.
Figure 11B:
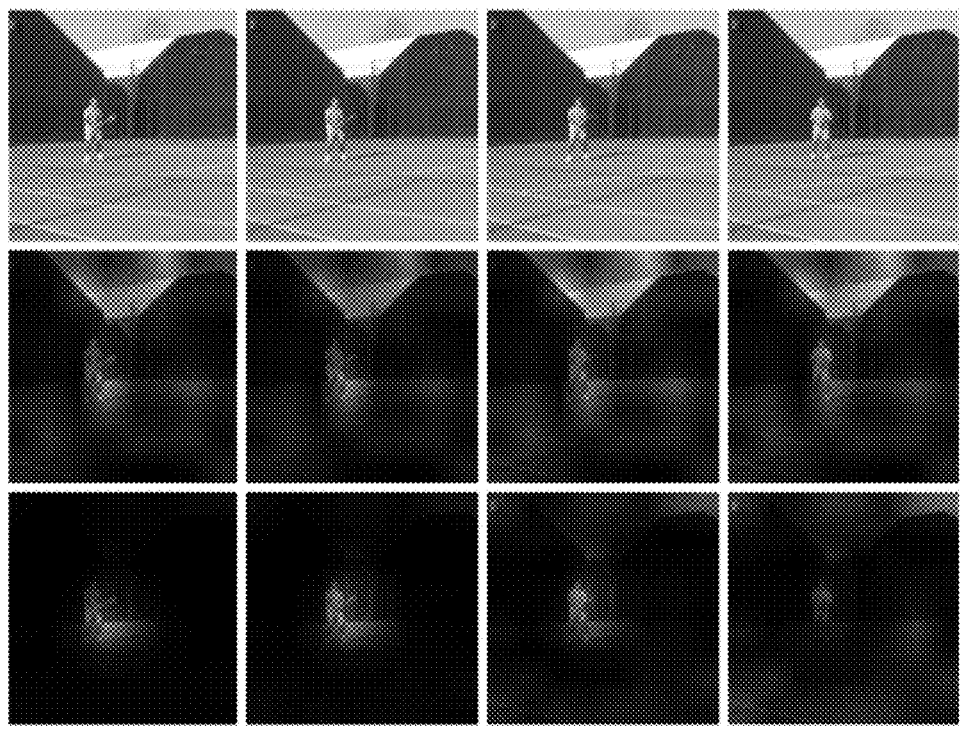

In FIGS. 11a-b, attention map visualizations for the actions "Lunges" (11a) and "Tennis Swing" (11b) are presented. The original video frames, serving as benchmarks, are displayed in the top rows. Subsequent rows exhibit the derived attention maps from self-supervised and supervised models. In the self-supervised model's attention maps, a distributed focus is evident, encompassing both the human figures and relevant environmental features such as the ground and background elements, indicating a broader semantic understanding. Conversely, the supervised model's attention maps are primarily concentrated on the human subjects, isolating them from the surrounding context and indicating a narrower scope of semantic extraction focused on human-related features.

Figure 12A:
FIGS. 12*a*-*b* depict the visualization of attention maps where the top row displays the original video, the middle row shows the attention of a self-supervised model, and the bottom row illustrates the attention of a supervised privacy classifier.
Figure 12B:
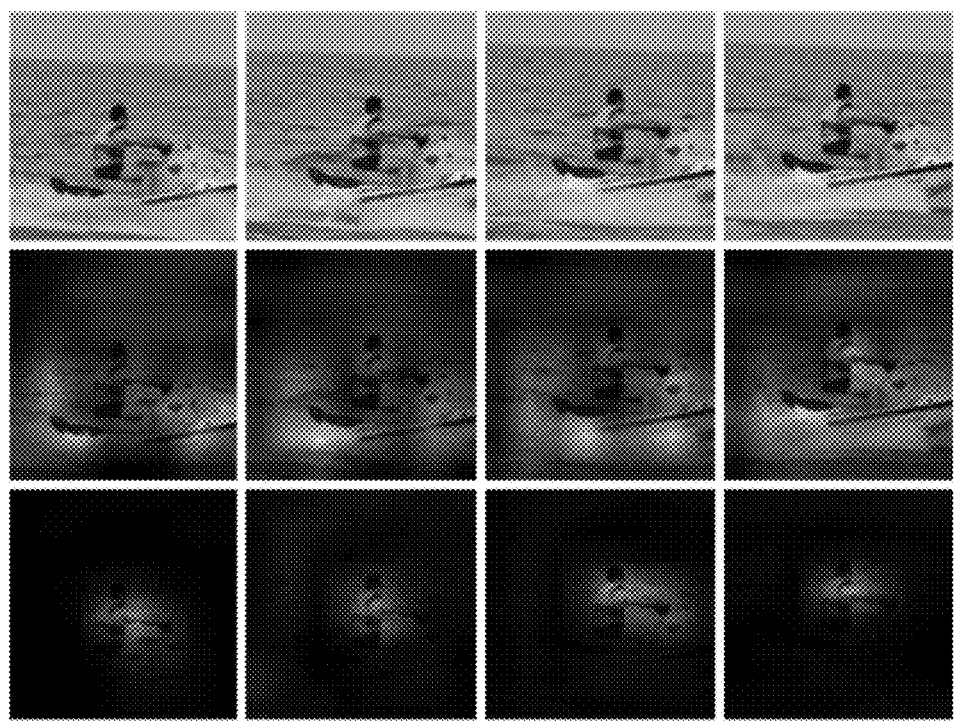

FIGS. 12a-b continue this examination with the actions "Playing Flute" (12a) and "Ski Jet" (12b). Here again, the original frames are juxtaposed with their respective attention maps from both model types. The self-supervised model showcases attention that encompasses both the human subjects and the critical objects associated with the actions (the flute and the jet ski), highlighting an integrated approach that considers the interaction between subjects and objects. In contrast, the attention maps from the supervised privacy classifiers display a confined focus, mostly centered around the human subjects without significant acknowledgment of the interacting objects, thus limiting the scope of semantic context extracted from the scene.

A self-supervised privacy preserving action recognition framework that does not require privacy labels during training achieves competitive performance compared to supervised baselines for the known action-privacy attributes. In addition, the self-supervised framework for the system and method achieves better generalization to novel action-privacy attributes compared to the supervised baseline.

Glossary of Claim Terms

2D-CNN Backbone means a neural network architecture designed for processing two-dimensional data inputs, such as images or video frames, through convolutional layers that extract spatial features essential for tasks like action recognition and privacy-sensitive information identification within a privacy preservation action recognition system.

3D-CNN Backbone means a neural network architecture that extends the 2D convolutional network concept into three dimensions, allowing it to process temporal information in video sequences by analyzing spatial features across consecutive frames, thereby enhancing its ability to recognize complex actions.

Ablation means a systematic process of removing or modifying components of a machine learning model or its training procedure to evaluate the impact of those components on the model's overall performance, often used to understand the contribution of specific features or techniques within privacy preservation action recognition systems.

Action Recognition means the computational task of analyzing sequences of video frames to identify and categorize human actions or activities depicted, utilizing algorithms that can differentiate between various movements while minimizing the impact on individual privacy.

Adam Optimizer means an optimization algorithm used in training neural networks, combining the advantages of two other extensions of stochastic gradient descent: Adaptive Gradient Algorithm (AdaGrad) and Root Mean Square Propagation (RMSProp), to update network weights iteratively based on training data.

Annotations are labels or data added to training samples to provide ground truth information for supervised learning tasks. In the context of action recognition and privacy preservation, annotations might include action labels for recognizing activities and privacy labels for identifying sensitive information, although the latter is not required in self-supervised settings.

Anonymization Branch means a specific part of a privacy preservation action recognition system responsible for applying transformations to video segments to conceal or remove identifiable information, ensuring the video's usability for action recognition while enhancing privacy.

Anonymization Function means a learnable algorithm within a privacy preservation action recognition system that modifies video data to obscure or eliminate spatial cues and identifiable markers without compromising the video's utility for recognizing actions.

Base Learning Rate means the initial rate of learning for a training process before any adjustments by a learning rate scheduler or other modifications. It sets the starting speed at which model weights are updated during training.

Binary Cross Entropy refers to a loss function used primarily for binary classification problems. It measures the difference between two probability distributions for the classification task, typically the predicted probabilities and the actual binary outcomes.

Branch in the context of neural networks, particularly in privacy preservation and action recognition systems, denotes a segment or pathway of the network designed to perform a specific subset of the overall task, such as action recognition or privacy information removal. Each branch operates on the input data or the features extracted by previous layers to contribute to the system's final output.

Bounding Boxes mean rectangular borders drawn around objects of interest in images or video frames, used to identify and locate these objects precisely within the space of the frame, often in tasks involving object detection, tracking, and recognition.

Budget Task is related to the secondary objective in a learning model aimed at minimizing resource usage, such as computational cost or data privacy. In privacy-preserving contexts, it often refers to reducing the amount of private information that can be inferred from the model's outputs.

Cloud Server typically refers to virtualized server resources accessible over the internet, offering scalable computing power and storage. In the context of action recognition, cloud servers may process and analyze video data, benefiting from their computational resources for intensive tasks.

Computer Processor means the hardware within a computing system that executes the operations and instructions of software applications, including those of privacy preservation action recognition systems, by performing calculations and controlling the system's components.

Contrastive Loss Function means a loss calculation used to train models by maximizing the similarity between pairs of data points that should be similar (positive pairs) and maximizing the dissimilarity between pairs that should be different (negative pairs), especially in self-supervised learning scenarios for privacy preservation.

Convolutional Neural Network (CNN) is a class of deep neural networks, most commonly applied to analyzing visual imagery. CNNs use a mathematical operation called convolution and have layers that act as filters, progressively extracting higher-level features from the input image or video frames.

Cross-Entropy Loss means a loss function commonly used in classification tasks, which measures the performance of a classification model whose output is a probability value between 0 and 1, providing a gauge of how well the model's predicted probabilities match the actual labels.

Cross-Dataset Training refers to a training protocol that employs separate datasets for optimizing different aspects of a privacy preservation action recognition system: one dataset annotated for action recognition and another annotated for privacy attributes. This method allows the system to learn generalized anonymization and recognition capabilities by exposing it to a wider variety of data scenarios, enhancing its adaptability to different privacy considerations and action types across datasets.

Datasets mean collections of video data curated for the purpose of training, validating, and testing machine learning models, particularly those involved in action recognition, where each video is typically labeled with one or more actions depicted in the sequence.

Data Augmentation involves artificially increasing the diversity of a training dataset by applying random transformations (e.g., rotation, scaling, cropping) to the original data. This technique helps improve the robustness and generalization ability of machine learning models.

Downsampling means the process of reducing the resolution of video frames or images by eliminating pixel data, which can help in reducing the detail level of privacy-sensitive information, though it may also affect the clarity of action recognition.

Encoding for Video refers to the process of converting raw video data into a structured representation using a neural network to obtain meaningful embeddings. This transformation retains the essential visual information required for tasks like action recognition and privacy preservation.

Epochs mean complete passes over the entire dataset used in training a machine learning model, where each epoch involves presenting all training samples to the model, allowing it to learn from the data iteratively and adjust its parameters to improve performance.

Frame means a single image or picture that constitutes one of the many sequential elements making up a video segment, serving as the basic unit for video analysis in tasks such as action recognition and privacy-sensitive content modification.

Frame Sampling refers to the process of selecting specific frames from a video sequence. This technique is used in video processing and analysis to reduce computational load or focus on significant moments within a video for tasks like action recognition.

Frozen in machine learning and deep learning, refers to the state of model parameters (or layers) that are not updated during a particular phase of training. Freezing parts of the model helps in fine-tuning specific sections while keeping others constant.

Gaussian Blur means a filtering technique applied to images or video frames to reduce detail and noise by averaging the pixels within a region, based on a Gaussian function, often used in privacy preservation to obscure faces or other identifiable features.

Learnable Transformation means a type of function, specifically utilized in the context of anonymization, that is capable of modifying input data (e.g., video segments) in a way that can be iteratively adjusted or optimized through the process of training. Such transformations aim to preserve essential information for a given task, like action recognition, while removing or obfuscating information that could compromise privacy.

Learning Rate Scheduler is a tool or strategy used in training machine learning models to adjust the learning rate during training. It modifies the learning rate based on predefined rules or metrics, often to improve training efficiency and model performance.

Minimax is an optimization strategy used in various contexts, including machine learning. It involves minimizing the possible losses for a worst-case scenario when an adversary is trying to maximize those losses. In privacy preservation, it could relate to adjusting models to minimize privacy risks while considering the maximization of such risks under adversarial conditions.

Multilayer-Projection Head is a component of neural networks, especially in self-supervised learning frameworks, that projects features extracted by the network into a space where learning objectives, such as contrastive loss, are applied. This component usually consists of several layers, including non-linearities, to transform the feature representation effectively.

Neural Networks mean computational models inspired by the human brain's structure, consisting of layers of interconnected nodes or "neurons" that process input data through weighted connections, learning to perform tasks by adjusting those weights based on experience.

Noisy Features Baseline means a reference model or technique within the context of privacy preservation action recognition systems that introduces randomness or "noise" into the data or feature representation, serving as a baseline to evaluate the impact of noise on the system's ability to recognize actions and preserve privacy.

Novel Action involves the system's evaluation on video segments depicting actions not present in the training dataset, testing the system's ability to generalize its action recognition capabilities to unseen scenarios. This protocol assesses the robustness of the learned anonymization and action recognition models against new, previously unobserved actions, ensuring the system maintains high performance in real-world applications where it may encounter a diverse array of human activities.

Obfuscation Baselines mean standard methods or procedures used to compare the effectiveness of various techniques in obscuring or hiding identifiable information within video segments, often involving the application of specific transformations like blurring or pixelation to enhance privacy.

Optimization of Model involves the process of iteratively adjusting the model parameters, including weights, to minimize or maximize a defined objective function. In the context of privacy preservation action recognition, the optimization process aims to find the best balance between action recognition performance and the level of privacy preservation.

Pretraining means the process of training a neural network model on a large dataset before fine-tuning it on a smaller, task-specific dataset, aiming to initialize the model with knowledge that enhances its performance on the specific task, such as action recognition in privacy preservation systems.

Privacy Classifier is a model or function used to identify and classify private or sensitive information within data. In the context of privacy-preserving action recognition, it might aim to detect and categorize private attributes like identity or location.

PyTorch means an open-source machine learning library based on the Torch library, widely used for applications in computer vision and natural language processing, offering dynamic computation graphs that facilitate building and training neural network models.

Raw Data means the original, unprocessed digital information captured by video recording devices, serving as the input for privacy preservation action recognition systems before any modifications for action recognition or privacy enhancement are applied.

Representation Space refers to the high-dimensional space where features extracted by neural networks reside. In this space, semantic similarities and differences among data samples can be quantified, aiding tasks like classification and recognition.

ResNet-50 Model means a specific configuration of the Residual Network architecture designed for image recognition tasks, comprising 50 layers, including convolutional layers, and employing shortcut connections to facilitate the training of deeper networks by addressing vanishing gradient issues.

Same-Dataset Training means a training protocol where a single dataset, annotated for both action recognition and privacy considerations, is used to train the components of a privacy preservation action recognition system. This approach ensures that the system learns to anonymize video data and recognize actions based on the same set of video segments, allowing for a unified optimization process where action recognition and privacy preservation goals are aligned within the context of the same data distribution.

Self-Supervised refers to a learning paradigm where the system utilizes the input data itself to generate labels or learning signals, bypassing the need for explicitly provided external ground-truth labels. In privacy preservation action recognition, this approach allows for the learning of effective feature representations and anonymization functions without reliance on privacy labels.

Semantic Information relates to the meaning or context derived from data, such as objects, actions, or scenes within images or videos. In privacy preservation, certain semantic information may be sensitive and targeted for removal or obfuscation to protect privacy.

Spatial Cues mean visual information within video frames that indicate the physical arrangement and characteristics of objects and individuals, which privacy preservation action recognition systems seek to modify or remove for enhancing privacy while retaining action-related information.

Spatio-Temporal refers to the combined aspects of space and time, especially concerning video or sequences of images. In action recognition, spatio-temporal features are useful for understanding motions and activities that unfold over time across different spatial regions of the frames.

Supervised Adversarial Framework means a training setup where a model is taught to generate outputs that are indistinguishable from real data, while another model simultaneously tries to distinguish between the model's output and real data, often used in contexts requiring the differentiation between genuine and modified content, such as privacy-enhanced videos.

Temporal Diversity signifies the variation in content or information across different time points or frames within a video. Capturing temporal diversity is relevant for understanding dynamic scenes and actions in video analysis tasks.

Temporal Frame Sampler means a component of privacy preservation action recognition systems that selects specific frames or pairs of frames from video segments based on temporal criteria, optimizing the input for processes like contrastive loss evaluation and ensuring diverse representation for effective learning.

Temporal Separation describes the distinction or interval between two points in time or frames within a video sequence. In video analysis, understanding or manipulating temporal separation can be important for recognizing actions that occur over varying durations.

Training Video means video segments specifically designated for the training phase of machine learning models, where these videos are used to teach the models to accurately recognize actions and effectively anonymize content for privacy protection, providing experiential data foundational to the models' learning processes.

Vector Pairs in the context of self-supervised learning for privacy preservation, typically refer to the feature vectors representing different data samples (e.g., frames from the same or different videos) used in contrastive learning. These pairs are compared to learn representations that capture essential information while discarding irrelevant or sensitive data.

Video means a sequence of images or frames displayed in succession at a certain rate, creating the illusion of motion, and serving as the primary medium for both the input and output of privacy preservation action recognition systems, where actions are analyzed and privacy-sensitive information is managed.

Weights represent the parameters within neural networks that are adjusted during training. They determine the significance of input features in producing the correct output. In privacy preservation action recognition, weights are optimized to balance the trade-off between maintaining action recognition accuracy and achieving effective privacy preservation.

REFERENCES

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

Daniel J Butler, Justin Huang, Franziska Roesner, and Maya Cakmak. The privacy-utility tradeoff for remotely teleoperated robots. In Proceedings of the tenth annual ACM/IEEE international conference on human-robot interaction, pages 27-34, 2015.

Marco Buzzelli, Alessio Albé, and Gianluigi Ciocca. A vision-based system for monitoring elderly people at home. Applied Sciences, 10(1):374, 2020.

Joao Carreira and Andrew Zisserman. Quo vadis, action recognition? a new model and the kinetics dataset. In proceedings of the IEEE Conference on Computer Vision and Pattern Recognition, pages 6299-6308, 2017.

Ting Chen, Simon Kornblith, Mohammad Norouzi, and Geoffrey Hinton. A simple framework for contrastive learning of visual representations. In ICML, 2020.

Edward Chou, Matthew Tan, Cherry Zou, Michelle Guo, Albert Haque, Arnold Milstein, and Li Fei-Fei. Privacy preserving action recognition for smart hospitals using low resolution depth images. arXiv preprint arXiv:1811.09950, 2018.

Ji Dai, Behrouz Saghafi, Jonathan Wu, Janusz Konrad, and Prakash Ishwar. Towards privacy-preserving recognition of human activities. In 2015 IEEE international conference on image processing (ICIP), pages 4238-4242. IEEE, 2015.

Ishan Dave, Rohit Gupta, Mamshad Nayeem Rizve, and Mubarak Shah. Tclr: Temporal contrastive learning for video representation. Computer Vision and Image Understanding, page 103406, 2022.

Ishan Dave, Zacchaeus Scheffer, Akash Kumar, Sarah Shiraz, Yogesh Singh Rawat, and Mubarak Shah. Gabriellav2: Towards better generalization in surveillance videos for action detection. In Proceedings of the IEEE/CVF Winter Conference on Applications of Computer Vision (WACV) Workshops, pages 122-132, January 2022.

Jia Deng, Wei Dong, Richard Socher, Li-Jia Li, Kai Li, and Li Fei-Fei. Imagenet: A large-scale hierarchical image database. In 2009 IEEE conference on computer vision and pattern recognition, pages 248-255. Ieee, 2009.

Ali Diba, Mohsen Fayyaz, Vivek Sharma, Manohar Paluri, Jiirgen Gall, Rainer Stiefelhagen, and Luc Van Gool. Large scale holistic video understanding. In European Conference on Computer Vision, pages 593-610. Springer, 2020.

Christoph Feichtenhofer, Haoqi Fan, Bo Xiong, Ross Girshick, and Kaiming He. A large-scale study on unsupervised spatiotemporal representation learning. In Proceedings of the IEEE/CVF Conference on Computer Vision and Pattern Recognition (CVPR), pages 3299-3309, June 2021.

Yaroslav Ganin and Victor Lempitsky. Unsupervised domain adaptation by backpropagation. In International conference on machine learning, pages 1180-1189. PMLR, 2015.

Kirill Gavrilyuk, Mihir Jain, Ilia Karmanov, and Cees G M Snoek. Motion-augmented self-training for video recognition at smaller scale. In Proceedings of the IEEE/CVF International Conference on Computer Vision, pages 10429-10438, 2021.

Spyros Gidaris, Praveer Singh, and Nikos Komodakis. Unsupervised representation learning by predicting image rotations. arXiv preprint arXiv:1803.07728, 2018.

Jean-Bastien Grill, Florian Strub, Florent Altché, Corentin Tallec, Pierre Richemond, Elena Buchatskaya, Carl Doersch, Bernardo Avila Pires, Zhaohan Guo, Mohammad Gheshlaghi Azar, et al. Bootstrap your own latent-a new approach to self-supervised learning. Advances in Neural Information Processing Systems, 33:21271-21284, 2020.

K. Hara, H. Kataoka, and Y. Satoh. Towards good practice for action recognition with spatiotemporal 3d convolutions. In 2018 24th International Conference on Pattern Recognition (ICPR), pages 2516-2521, 2018.

Kaiming He, Haoqi Fan, Yuxin Wu, Saining Xie, and Ross Girshick. Momentum contrast for unsupervised visual representation learning. In Proceedings of the IEEE/CVF Conference on Computer Vision and Pattern Recognition, pages 9729-9738, 2020.

Kaiming He, Xiangyu Zhang, Shaoqing Ren, and Jian Sun. Deep residual learning for image recognition. In Proceedings of the IEEE conference on computer vision and pattern recognition, pages 770-778, 2016.

Carlos Hinojosa, Juan Carlos Niebles, and Henry Arguello. Learning privacy-preserving optics for human pose estimation. In Proceedings of the IEEE/CVF International Conference on Computer Vision, pages 2573-2582, 2021.

Simon Jenni and Hailin Jin. Time-equivariant contrastive video representation learning. In Proceedings of the IEEE/CVF International Conference on Computer Vision, pages 9970-9980, 2021.

Li Jia and Richard J Radke. Using time-of-flight measurements for privacy-preserving tracking in a smart room. IEEE Transactions on Industrial Informatics, 10(1):689-696, 2013.

Glenn Jocher. ultralytics/yolov5: v3.1—Bug Fixes and Performance Improvements. https://github.com/ultralytics/yolov5, October 2020.

Diederik P. Kingma and Jimmy Ba. Adam: A method for stochastic optimization. In Yoshua Bengio and Yann LeCun, editors, 3rd International Conference on Learning Representations, ICLR 2015, San Diego, CA, USA, May 7-9, 2015, Conference Track Proceedings, 2015.

H. Kuehne, H. Jhuang, E. Garrote, T. Poggio, and T. Serre. HMDB: a large video database for human motion recognition. In Proceedings of the International Conference on Computer Vision (ICCV), 2011.

Tsung-Yi Lin, Michael Maire, Serge Belongie, James Hays, Pietro Perona, Deva Ramanan, Piotr Doll'ar, and C Lawrence Zitnick. Microsoft coco: Common objects in context. In European conference on computer vision, pages 740-755. Springer, 2014.

Jixin Liu, Rong Tan, Guang Han, Ning Sun, and Sam Kwong. Privacy-preserving in-home fall detection using visual shielding sensing and private information-embedding. IEEE Transactions on Multimedia, 2020.

Jixin Liu and Leilei Zhang. Indoor privacy-preserving action recognition via partially coupled convolutional neural network. In 2020 International Conference on Artificial Intelligence and Computer Engineering (ICAICE), pages 292-295. IEEE, 2020.

Wenhe Liu, Guoliang Kang, Po-Yao Huang, Xiaojun Chang, Yijun Qian, Junwei Liang, Liangke Gui, JingWen, and Peng Chen. Argus: Efficient activity detection system for extended video analysis. In Proceedings of the IEEE/CVF Winter Conference on Applications of Computer Vision (WACV) Workshops, March 2020.

Tribhuvanesh Orekondy, Bernt Schiele, and Mario Fritz. Towards a visual privacy advisor: Understanding and predicting privacy risks in images. In IEEE International Conference on Computer Vision (ICCV), 2017.

Tian Pan, Yibing Song, Tianyu Yang, Wenhao Jiang, and Wei Liu. Videomoco: Contrastive video representation learning with temporally adversarial examples. In Proceedings of the IEEE/CVF Conference on Computer Vision and Pattern Recognition, pages 11205-11214, 2021.

Francesco Pittaluga, Sanjeev Koppal, and Ayan Chakrabarti. Learning privacy preserving encodings through adversarial training. In 2019 IEEE Winter Conference on Applications of Computer Vision (WACV), pages 791-799. IEEE, 2019.

Francesco Pittaluga and Sanjeev J Koppal. Privacy preserving optics for miniature vision sensors. In Proceedings of the IEEE Conference on Computer Vision and Pattern Recognition, pages 314-324, 2015.

Francesco Pittaluga and Sanjeev Jagannatha Koppal. Pre-capture privacy for small vision sensors. IEEE transactions on pattern analysis and machine intelligence, 39(11):2215-2226, 2016.

Rui Qian, Yuxi Li, Huabin Liu, John See, Shuangrui Ding, Xian Liu, Dian Li, and Weiyao Lin. Enhancing self-supervised video representation learning via multi-level feature optimization. In Proceedings of the International Conference on Computer Vision (ICCV), 2021.

Rui Qian, Tianjian Meng, Boqing Gong, Ming-Hsuan Yang, Huisheng Wang, Serge Belongie, and Yin Cui. Spatiotemporal contrastive video representation learning. In Proceedings of the IEEE/CVF Conference on Computer Vision and Pattern Recognition, pages 6964-6974, 2021.

Kanchana Ranasinghe, Muzammal Naseer, Salman Khan, Fahad Shahbaz Khan, and Michael Ryoo. Self-supervised video transformer. arXiv preprint arXiv:2112.01514, 2021.

Joseph Redmon, Santosh Divvala, Ross Girshick, and Ali Farhadi. You only look once: Unified, real-time object detection. In Proceedings of the IEEE conference on computer vision and pattern recognition, pages 779-788, 2016.

Zhongzheng Ren, Yong Jae Lee, and Michael S Ryoo. Learning to anonymize faces for privacy preserving action detection. In Proceedings of the European conference on computer vision (ECCV), pages 620-636, 2018.

Mamshad Nayeem Rizve, Ugur Demir, Praveen Tirupattur, Aayush Jung Rana, Kevin Duarte, Ishan R Dave, Yogesh S Rawat, and Mubarak Shah. Gabriella: An online system for real-time activity detection in untrimmed security videos. In 2020 25th International Conference on Pattern Recognition (ICPR), pages 4237-4244. IEEE, 2021.

Olaf Ronneberger, Philipp Fischer, and Thomas Brox. Unet: Convolutional networks for biomedical image segmentation. In International Conference on Medical image computing and computer-assisted intervention, pages 234-241. Springer, 2015.

Michael S Ryoo, Brandon Rothrock, Charles Fleming, and Hyun Jong Yang. Privacy-preserving human activity recognition from extreme low resolution. In Thirty-First AAAI Conference on Artificial Intelligence, 2017.

Khurram Soomro, Amir Roshan Zamir, and Mubarak Shah. Ucf101: A dataset of 101 human actions classes from videos in the wild. arXiv preprint arXiv:1212.0402, 2012.

Vinkle Srivastav, Afshin Gangi, and Nicolas Padoy. Human pose estimation on privacy-preserving low-resolution depth images. In International Conference on Medical Image Computing and Computer-Assisted Intervention, pages 583-591. Springer, 2019.

Du Tran, Lubomir Bourdev, Rob Fergus, Lorenzo Torresani, and Manohar Paluri. Learning spatiotemporal features with 3d convolutional networks. In Proceedings of the IEEE international conference on computer vision, pages 4489-4497, 2015.

Du Tran, Heng Wang, Lorenzo Torresani, Jamie Ray, Yann LeCun, and Manohar Paluri. A closer look at spatiotemporal convolutions for action recognition. In Proceedings of the IEEE conference on Computer Vision and Pattern Recognition, pages 6450-6459, 2018.

Zihao W Wang, Vibhav Vineet, Francesco Pittaluga, Sudipta N Sinha, Oliver Cossairt, and Sing Bing Kang. Privacy-preserving action recognition using coded aperture videos. In Proceedings of the IEEE/CVF Conference on Computer Vision and Pattern Recognition Workshops, pages 0-0, 2019.

Zhenyu Wu, Haotao Wang, Zhaowen Wang, Hailin Jin, and Zhangyang Wang. Privacy-preserving deep action recognition: An adversarial learning framework and a new dataset. IEEE Transactions on Pattern Analysis and Machine Intelligence, 2020.

Zhenyu Wu, Zhangyang Wang, Zhaowen Wang, and Hailin Jin. Towards privacy-preserving visual recognition via adversarial training: A pilot study. In Proceedings of the European Conference on Computer Vision (ECCV), pages 606-624, 2018.

Taihong Xiao, Yi-Hsuan Tsai, Kihyuk Sohn, Manmohan Chandraker, and Ming-Hsuan Yang. Adversarial learning of privacy-preserving and task-oriented representations. In Proceedings of the AAAI Conference on Artificial Intelligence, volume 34, pages 12434-12441, 2020.

Sergey Zagoruyko and Nikos Komodakis. Paying more attention to attention: Improving the performance of convolutional neural networks via attention transfer. In 5th International Conference on Learning Representations, ICLR 2017, Toulon, France, Apr. 24-26, 2017, Conference Track Proceedings. OpenReview.net, 2017.

Jure Zbontar, Li Jing, Ishan Misra, Yann LeCun, and Stéphane Deny. Barlow twins: Self-supervised learning via redundancy reduction. In International Conference on Machine Learning, pages 12310-12320. PMLR, 2021.

Chenyang Zhang, Yingli Tian, and Elizabeth Capezuti. Privacy preserving automatic fall detection for elderly using rgbd cameras. In International Conference on Computers for Handicapped Persons, pages 625-633. Springer, 2012.

Dalin Zhang, Lina Yao, Kaixuan Chen, Guodong Long, and Sen Wang. Collective protection: Preventing sensitive inferences via integrative transformation. In 2019 IEEE International Conference on Data Mining (ICDM), pages 1498-1503. IEEE, 2019.

Zhixiang Zhang, Thomas Cilloni, Charles Walter, and Charles Fleming. Multi-scale, class-generic, privacy preserving video. Electronics, 10(10):1172, 2021.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A self-supervised privacy preservation action recognition system, the system comprising:
   at least one computer processor accessing a first video having a plurality of frames, the at least one computer processor configured to apply a learnable transformation anonymization function to the first video to remove spatial cues from the frames wherein the learnable transformation anonymization function applies an anonymization model created by the at least one computer processor configured to iteratively apply to a training video dataset:
   a. freeze an action recognition branch and a self-supervised privacy removal branch wherein an anonymization branch for the model provides weight adjustment of a defined objective function by the at least one computer processor for optimized anonymization by iteration over the training video dataset to produce a first batch output of image frames;
   b. evaluate the first batch output of image frames against the action recognition branch for both action recognition and privacy contrastive loss and further evaluate the first batch of output of image frames for the self-supervised privacy removal branch for both action recognition and privacy contrastive loss;
   c. freeze the anonymization branch wherein the action recognition branch and self-supervised privacy removal branch for the model provide weight adjustment of a defined objective function by the at least one computer processor to enhance action recognition and privacy contrastive loss by iteration over the training video dataset to produce a second batch output of image frames;
   d. compute the action recognition and privacy contrastive loss of the second batch output of image frames against the anonymization branch; and
   e. alternate between steps a-b and steps c-d to optimize weights in the model to achieve both action recognition accuracy and privacy preservation effectiveness;
   an encoding function executed by the at least one processor to output a second video with the removed spatial cues wherein the second video preserves data for action recognition yet provides privacy preservation without the need for privacy labels.

2. The system of claim 1, wherein the learnable transformation anonymization function utilizes an encoder-decoder network structure, the encoder-decoder network including at least one sigmoid activation layer to constrain the output of the anonymized frames to a value range between 0 and 1.

3. The system of claim 1, wherein the action recognition branch is implemented using a three-dimensional convolutional neural network (3D-CNN), the 3D-CNN being pretrained on a dataset comprising a plurality of different actions without using any privacy-sensitive annotations.

4. The system of claim 1, wherein the self-supervised privacy removal branch comprises a two-dimensional convolutional neural network (2D-CNN) specifically pretrained to distinguish between semantically similar and dissimilar frames using a contrastive learning approach without requiring privacy-specific labels.

5. The system of claim 1, further comprising sampling pairs of frames from the anonymized video based on a non-random, predetermined criterion related to their temporal separation within the video sequence to optimize the evaluation of privacy-preserving efficacy.

6. The system of claim 5, wherein the sampled pairs of frames are at least 5 but no more than 15 frames apart.

7. The system of claim 1, wherein the system applies specific data augmentation techniques, including but not limited to, rotation, scaling, and cropping to the first video during the training phase to improve the model's generalization ability across varying video presentation styles.

8. The system of claim 1, implements a minimax optimization protocol within the anonymization function, specifically designed to iteratively adjust the anonymization model parameters such that the action recognition accuracy is maximized for the action recognition branch while simultaneously maximizing the privacy contrastive loss for the privacy removal branch.

9. The system of claim 1, includes a video anonymization module applying anonymization to the second video, ensuring the anonymization maintains a predetermined threshold for action recognition accuracy and privacy preservation as established during system training.

10. The system of claim 1, wherein the at least one processor transmits the second video to a cloud server for utility action recognition.

11. The system of claim 1, wherein the training video dataset comprises a same-dataset training protocol, including video segments annotated with both action labels and privacy labels, to facilitate simultaneous learning of action recognition and privacy preservation within the same data context.

12. The system of claim 1, further comprising a cross-dataset training protocol, wherein the at least one computer processor is configured to apply the learnable transformation anonymization function to separate training video datasets: one annotated exclusively for action recognition and another annotated exclusively for privacy considerations, enhancing the system's ability to generalize across varied data types.

13. The system of claim 1, further configured to evaluate the effectiveness of the learned anonymization and action recognition models against a novel action dataset comprising video segments depicting actions not present in the training video dataset, testing the system's generalization capabilities to unseen actions while maintaining privacy preservation effectiveness to adjust the model.

14. A self-supervised privacy preservation action recognition method, comprising the steps of:
   a. passing a video segment through an anonymization function to obtain an anonymized video segment by transforming the video segment to remove identifiable spatial cues, utilizing an encoder-decoder model that operates without reliance on privacy-specific annotations;
   b. selecting a pair of frames from the anonymized video segment using a temporal frame sampler based on a predefined strategy to optimize the evaluation of privacy information removal;
   c. passing the selected pair of frames through a 2D-CNN backbone and a multilayer-projection head to project the frames into a representation space; and
   d. applying a contrastive loss function in the representation space to maximize agreement between the projection vector pair of the selected frames while maximizing disagreement with projection vector pairs from different video segments, thereby optimizing the anonymized video segment for privacy preservation without compromising the integrity of action recognition data.

15. The method of claim 14, wherein the anonymization function is initialized to function as an identity transformation and is further refined through iterative training to enhance privacy preservation by removing spatial cues without requiring privacy-target model annotations.

16. The method of claim 14, wherein the temporal frame sampler is configured to select frames different time points within each anonymized video segment.

17. The method of claim 14, further comprising training the 2D-CNN backbone using a self-supervised learning approach prior to integration into the privacy preservation action recognition system, thereby ensuring the model's capability to effectively process the selected pair of frames for contrastive loss evaluation.

18. The method of claim 14, wherein the multilayer-projection head is utilized to transform the output of the 2D-CNN backbone into a representation space where the contrastive loss function is applied, ensuring that the vectors representing the selected frames are appropriately aligned or distanced for optimal privacy preservation.

19. The method of claim 14, further including adjusting the parameters of the anonymization function, the 2D-CNN backbone, and the multilayer-projection head based on the outcome of the contrastive loss function application, employing a minimax optimization strategy to simultaneously preserve action recognition quality and enhance privacy.

20. A method for self-supervised privacy preservation in action recognition, implemented on a computing system, comprising:
  a. receiving, by at least one processor, a first video comprising a plurality of frames;
  b. applying, by the at least one processor, a learnable transformation anonymization function to the first video to obscure spatial cues from the frames, wherein the anonymization function applies an anonymization model iteratively over a training video dataset, the model comprising:
    i. an anonymization branch providing weight adjustments of a defined objective function to increase anonymization;
    ii. a first auxiliary action recognition model and a first auxiliary privacy model, configured to train concurrently with the anonymization branch during a first phase, wherein the first auxiliary models are evaluated for action recognition and privacy contrastive loss and subsequently discarded;
  c. freezing, by the at least one processor, the learned anonymization function after the first phase;
  d. training, by the at least one processor during a second phase, target action recognition models different from the first auxiliary action detection model, using the frozen anonymization function to evaluate performance on anonymized training data while maintaining the ability to recognize actions;
  e. freezing, by the at least one processor, the target action recognition models after the second phase;
  f. evaluating, by the at least one processor during a third phase, the frozen target models on an anonymized version of a test or evaluation dataset to assess action recognition accuracy while preserving privacy; and
  g. executing, by the at least one processor, an encoding function to output a second video with the obscured spatial cues, wherein the second video preserves data for action recognition yet provides privacy preservation without the need for privacy labels.

21. A method for cross-dataset self-supervised privacy preservation in action recognition, implemented on a computing system, comprising:
  a. providing, by at least one processor, a first action video dataset and a first privacy video dataset, each comprising a plurality of video frames and associated action and privacy labels respectively;
  b. applying, by the at least one processor, a learnable transformation anonymization function to obscure spatial cues from the frames of both datasets, wherein the anonymization function employs an anonymization model iteratively trained over the first action and privacy video datasets to:
    i. learn anonymization transformations that obscure identifiable features while retaining action-relevant information;
    ii. discard first auxiliary models post training, which were used to optimize the anonymization function based on action recognition and privacy loss metrics;
  c. initializing, by the at least one processor, second action and privacy target models distinct from the first auxiliary models;
  d. training, by the at least one processor, the second action target model using the anonymized version of a second action video dataset and the second privacy target model using the anonymized version of a second privacy video dataset, different from the first datasets, wherein the training utilizes a frozen anonymization function to maintain the privacy of individuals while evaluating performance based on action recognition and privacy metrics;
  e. freezing, by the at least one processor, a learned second action and privacy target models after training;
  f. evaluating, by the at least one processor, the performance of the frozen second action and privacy target models on anonymized versions of third action and privacy evaluation datasets to measure action recognition accuracy and privacy preservation, wherein the third datasets are different from both the first and second datasets, ensuring cross-dataset validation and robustness of the learned models; and
  g. executing, by the at least one processor, an encoding function to output videos with obscured spatial cues from both action and privacy datasets, so that final output videos preserve essential data for action recognition while ensuring privacy preservation across diverse datasets.

* * * * *